| United States Patent [19] | [11] Patent Number: 4,488,904 |
|---|---|
| Miura et al. | [45] Date of Patent: Dec. 18, 1984 |

[54] METHOD AND APPARATUS FOR RETRIEVING METALLIC VAPOR IN THE LIQUID PHASE USING POOL OF MOLTEN RETRIEVING METAL

[75] Inventors: Hirohisa Miura; Hiroshi Satou; Toshio Natsume, all of Toyota, Japan

[73] Assignee: Toyota Jidosha Kabushiki Kaisha, Toyota, Japan

[21] Appl. No.: 493,243

[22] Filed: May 10, 1983

[51] Int. Cl.³ ............................................... C22B 7/00
[52] U.S. Cl. ........................................ 75/62; 75/63; 75/67 R
[58] Field of Search ................ 75/62, 25, 67, 63, 65 R

[56] References Cited

U.S. PATENT DOCUMENTS

| 3,634,067 | 1/1972 | Klein | 75/67 R |
| 4,140,523 | 2/1979 | Haddad | 75/67 R |
| 4,204,860 | 5/1980 | Kibby | 75/67 R |
| 4,396,424 | 8/1983 | Yatsunami | 75/25 |

*Primary Examiner*—Peter D. Rosenberg
*Attorney, Agent, or Firm*—Oblon, Fisher, Spivak, McClelland & Maier

[57] ABSTRACT

A mixture gas containing metallic vapor with oxidizing gas produced by reducing of the oxide of the metal at high temperature is led, at a high enough temperature and a low enough pressure for the reverse oxidization reaction between them to not substantially take place, into a convergent-divergent nozzle, and squirts out from the nozzle, as cooled down rapidly by adiabatic expansion in the nozzle to a low enough temperature for the oxidization reaction between them to not substantially take place, to be led to the surface of a pool of molten retrieving metal, either directly or via deceleration. The retrieving pool metal may be the same kind as the metallic vapor to be retrieved, or may be different. When the metallic vapor to be retrieved is magnesium vapor, the retrieving metal of the different kind may be lead, bismuth, tin, antimony, or a mixture thereof.

10 Claims, 14 Drawing Figures

F I G. 5
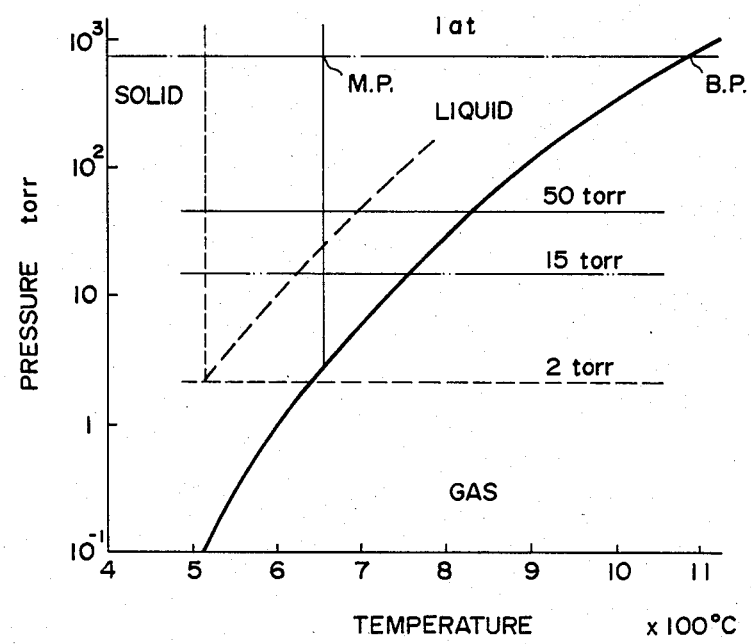

METHOD AND APPARATUS FOR RETRIEVING METALLIC VAPOR IN THE LIQUID PHASE USING POOL OF MOLTEN RETRIEVING METAL

BACKGROUND OF THE INVENTION

The present invention relates to a method for retrieving metallic vapor from a mixture gas which contains said metallic vapor, and to a device for practicing said method; and more particularly relates to a method for retrieving, from a mixture gas which has been produced by a reduction reaction of an oxide of a metal and which contains vapor of said metal and oxidizing gas also produced as a result of said reduction reaction, said metallic vapor in a liquid state, and to a device for practicing said method.

A known method of preparing a metal in the pure state is to reduce an oxide of the metal by heating this oxide to a high temperature along with a reducing material which then preferentially combines with the oxygen in said oxide, thus abstracting said oxygen from the oxide and leaving the metal in pure form. At such a high temperature the metal is left in the form of metallic gas or vapor, and this vapor is mixed with the other products of the reduction reaction, i.e. with a compound or compounds of the oxygen and the reducing material. Thus, the question arises as to how the metallic vapor can be cooled down and separated from the product of the reduction reaction, without the reverse or oxidizing reaction occurring, i.e., without the metallic vapor recombining with the reduction reaction product. This reverse reaction can easily occur, especially in the case of certain metals such as for example magnesium.

In the case of metals which have a relatively low tendency to undergo the reverse or oxidizing reaction, and which have a low melting point, such as for example zinc, there has been practiced a prior art retrieval method in which the high temperature mixture gas consisting of the gaseous products of the reduction reaction including zinc vapor has been introduced into a condenser containing a mass of molten metal having a fairly low temperature which is lower than that of the mixture gas, and in which the metallic vapor in the mixture gas has been condensed into liquid by the molten metal being contacted intimately with the mixture gas by being splashed with a stirrer or paddle or impeller or the like. Thereby, the metallic vapor is rapidly cooled and is picked up by the molten metal. As a variation of this prior art method, it has been known for the condenser to be shaped as a U-shaped tube, with the molten metal for retrieval contained in the bend of the tube, and for the mixture gas consisting of the gaseous products of the reduction reaction including the metallic vapor to be blown around this U-shaped tube, being bubbled through the molten metal for retrieval.

This prior art method is effective for retrieving the vapor of a metal such as zinc which has a relatively low tendency to undergo the reverse or oxidizing reaction and which has a low melting point, but it does not work well in the case of retrieving the vapor of a metal such as magnesium or calcium which has a relatively high tendency to undergo the reverse or oxidizing reaction and which has a high melting point. In such a case, when this method is applied to retrieving the vapor of (for example) magnesium or calcium, the reverse or oxidizing reaction occurs to such an extent that both the purity of the retrieved metal and also the efficiency of retrieval are unacceptably low. Therefore, as far as these metals are concerned, this method is not of practical use for retrieving their vapors.

Another prior art method for retrieving metallic vapor from the gaseous products of a reduction reaction including said metal vapor has been the so called gas cooling method, in which a large volume of natural gas or hydrogen gas has been blown into and mixed with said gaseous products of the reduction reaction which are at a high temprature, so as rapidly to cool them. However, with such a retrieval method, it is very difficult completely to prevent the reverse reaction occurring, and according to this the purity of the retrieved metal is low, about 50% or so in the case of a continuous process. Further, this method has the additional disadvantage of having a high cost, since a large volume of gas for cooling is required.

SUMMARY OF THE INVENTION

Accordingly, in view of the above problems, it is the primary object of the method aspect of the present invention to provide a method of retrieving metallic vapor from a mixture gas, consisting of the gaseous products of a reduction reaction including the metallic vapor, which effectively performs such retrieval.

It is a further object of the present invention to provide such a method of retrieving metallic vapor from a mixture gas, which provides retrieved metal of high purity.

It is a further object of the present invention to provide such a method of retrieving metallic vapor from a mixture gas, which retrieves a high proportion or ratio of the metallic vapor.

It is a further object of the present invention to provide such a method of retrieving metallic vapor from a mixture gas, which retrieves the metal in the liquid phase.

It is a further object of the present invention to provide such a method of retrieving metallic vapor from a mixture gas, which is suitable for retrieving the vapor of a metal which has a high tendency to undergo the reverse or oxidization reaction.

It is a yet further object of the present invention to provide such a method of retrieving metallic vapor from a mixture gas, which is suitable for retrieving the vapor of a metal which has a high melting point.

It is a yet further object of the present invention to provide such a method of retrieving metallic vapor from a mixture gas, which does not require any large volume of cooling gas.

It is a yet further object of the present invention to provide such a method of retrieving metallic vapor from a mixture gas, which is of acceptably low cost.

According to the most general method aspect of the present invention, these and other objects relating to a method are accomplished by a method of retrieving metallic vapor from a mixture gas containing said metallic vapor together with oxidizing gas, wherein: said mixture gas is led, at a high energy temperature and a low enough pressure for the oxidization reaction between the metallic vapor and the oxidizing gas to not substantially take place, into the upstream end of a convergent-divergent nozzle; and the jet emitted from the downstream end of the convergent-divergent nozzle, which has been cooled rapidly by adiabatic expansion in said convergent-divergent nozzle to a low enough temperature for the oxidization reaction between the metallic vapor and the oxidizing gas to not substantially take place, is led to the surface of a pool of molten retrieving metal.

Further, according to the present invention, these and other objects relating to an apparatus are accomplished by an apparatus for retrieving metallic vapor from a mixture gas containing said metallic vapor together with oxidizing gas, comprising: a gas tight housing means which defines a mixture gas supplying chamber for supplying said mixture gas at a high enough temperature and a low enough pressure for the oxidization reaction between the metallic vapor and the oxidizing gas to not substantially take place, and a retrieving chamber for accomodating a pool of molten retrieval metal; a convergent-divergent nozzle leading from said mixture gas supplying chamber to said retrieving chamber; means for heating said mixture gas supplying chamber to said high enough temperature and for heating said retrieving chamber to a sufficient temperature to keep said pool of molten retrieval metal in the molten state; and means for depressurizing the interior of said housing means, so that the interior of said mixture gas supplying chamber is kept at said low enough pressure.

Basically, the present invention is based upon the well known principle developed by F. J. Hansgirg towards the end of the 1920's: that the reaction of equation (1) below proceeds to the right, for thermodynamical reasons, at temperatures over 1860° C.

$$MgO + C = Mg + CO \tag{1}$$

According to the present invention as described above, in the case of retrieving metallic magnesium vapor from the mixture gas as described above consisting of magnesium vapor and carbon monoxide which has been made in the reducing furnace at high temperature by squirting it through a convergent-divergent nozzle (thus rapidly cooling it at a high rate such as $10^{6°}$ C. or greater) and by using magnesium as the molten retrieving metal to receive the jet flow from the nozzle, as will be understood from results obtained in the second, third, and fourth preferred embodiments of the present invention, which will be detailed later in this specification, a much improved performance, over conventional methods, of retrieving magnesium vapor can be obtained. In fact, as will be seen later, a retreval ratio of 90% or more can be realized, and the purity of the magnesium end product can be as high as 90% or so (vide infra). Further, the product is directly usable in its molten state.

However, since the molten magnesium retrieving metal pool needs to be kept in the molten state at all times, its temperature needs to be kept at 650° C. (which is the melting point of magnesium) or higher; and for instance if the temperature of this molten magnesium retrieving metal pool is kept at around 700° C. then since at this temperature magnesium has a vapor pressure of 6.7 torr a certain amount of magnesium vapor, corresponding to this vapor pressure, is ejected from the metallic vapor retrieval chamber without being retrieved, as a vaporization loss. Hence even in an experimental furnace the retrieval ratio of magnesium cannot be brought to exceed 96% (94.1% in lot average). Further, although the molten magnesium retrieving metal pool is in the liquid state, the magnesium vapor in the jet flow from the convergent-divergent nozzle and the carbon monoxide in said jet flow mutually react together to a certain extent as they plunge together into the molten retrieving magnesium metal pool, and further on the boundary surfaces of the carbon monoxide bubbles in the molten magnesium some of the molten magnesium is undesirably oxidized. Hence according to operation in an experimental furnace it is difficult to increase the purity of the retrieved magnesium metal to 93.3% (92% in lot average) or higher.

Therefore, according to a particular feature of the present invention, it is proposed to practice a method as described above, in which said retrieving metal is a different metal from said metallic vapor.

By suitably choosing the retrieving metal in accordance with the metallic vapor which is desired to be retrieved, as will be seen hereinafter an improved performance of retrieving metallic vapor can be obtained. In particular, by choosing a type of retrieval metal which has a lower melting point than the metallic vapor which is desired to be retrieved, the temperature of the pool of molten retrieving metal can be kept lower than if it were composed of the same type of metal as the metallic vapor, and accordingly the occurrence of the reverse or oxidization reaction can be reduced. Thereby the efficiency of the retrieval of the metallic vapor can be increased, and the purity of the final product can also be improved.

In particular, the particular case wherein said metallic vapor is magnesium, and said retrieving metal is selected from the group composed of lead, bismuth, tin, antimony, and mixtures thereof, is of particular interest.

In this particular case, when this method is applied to a refining system for magnesium in which magnesium oxide and carbon are heated together in a reduction furnace, so as to produce a mixture gas consisting of metallic magnesium vapor and carbon monoxide gas, which is as stated above retrieved by being squirted through the convergent-divergent nozzle and by being led into a pool of molten retrieving metal which is either lead, bismuth, tin, antimony, or a mixture thereof, then since the temperature and pressure conditions in the reduction furnace may be chosen so as best to promote the reduction reaction of magnesium oxide with carbon, while the size and other parameters of the convengent-divergent nozzle may be selected as proper in order to provide the desired pressure drop and the desired temperature drop therethrough, thereby the retrieving metal pool may be kept at a temperature sufficient to keep it molten, and the efficiency of the magnesium reduction system as a whole may be improved.

When the rapidly cooled and condensed magnesium vapor is absorbed by the molten retrieval metal pool, the magnesium forms a eutectic solution with the material (lead, bismuth, tin, antimony, or a mixture thereof) of said molten retrieving metal pool. The following consequences will ensure.

First, upon this eutectic dissolution the chemical activity of the magnesium drops, as compared with the case of only magnesium. In FIG. 1 of the accompanying drawings, there is given a graph, in which partial mol ratio of magnesium is shown along the horizontal axis, and the activity coefficient (activity/mol ratio) of the magnesium is shown logarithmically along the vertical axis. The four lines show the variation of activity coefficient of magnesium with respect to its partial mol ratio, when the magnesium is in a eutectic solution with, respectively, lead, bismuth, tin, and antimony, at a temperature of 850° C. From this figure, it can be seen that in the region of partial mol ratio equal to about 0.4 the activity coefficient of magnesium (and the activity) drops suddenly with a decrease in the mol partial ratio.

Now, when the activity of magnesium drops suddenly, the reverse or oxidization reaction between magnesium metal vapor and carbon monoxide becomes difficult to occur suddenly. In other words, metallic magnesium and carbon monoxide change into magnesium oxide and carbon according to the following equation (2):

$$Mg + CO = MgO + C \qquad (2)$$

and this equation (2) proceeds to the right when the free energy dF expressed by equation (3) below of the reaction becomes negative:

$$dF = dF' - RT\ln(a_{Mg}) - RT\ln(P_{CO}) \qquad (3)$$

where:
dF is the free energy of the reaction of equation (2);
dF' is the standard free energy of the reaction of equation (2);
R is the gas constant;
T is the temperature;
$a_{Mg}$ is the activity of magnesium;
and $P_{CO}$ is the pressure of carbon monoxide.

For instance, when T equals 300° to 900° C., $P_{CO}$ equals 0.1 to 200 torr, $a_{Mg}$ equals 1.0, then dF is negative, and the magnesium can return to magnesium oxide by oxidization. However, the activity of magnesium drops suddenly as it enters into a eutectic solution with lead, bismuth, tin, antimony, or a mixture thereof, as shown in FIG. 1, and so dF becomes greater as the second term of equation (3) becomes smaller, and the reverse or oxidization reaction expressed by equation (2) becomes more difficult to occur suddenly.

Now, as the activity of magnesium drops, its vapor pressure also becomes smaller. Generally, the magnesium vapor pressure $P_{Mg\ in\ Pb}$ of magnesium in a Pb-Mg bath containing $x_i$ mol of magnesium at the temperature of T° C. may be expressed by equation (4) below:

$$P_{Mg\ in\ Pb} = P_{Mg\ (pure)} + a_{Mg\ in\ Pb} \qquad (4)$$

where:
$P_{Mg\ (pure)}$ is the vapor pressure of pure magnesium at T° C.;
and $a_{Mg\ in\ Pb}$ is the activity of Mg in a Pb-Mg bath containing $x_i$ mol of Mg at T° C.

As can clearly be seen from equation (4), as the activity of magnesium drops, its vapor pressure becomes smaller. In FIG. 2, in which temperature in degrees centigrade is shown along the horizontal axis and vapor pressure is shown logarithmically along the vertical axis, the variation with temperature of the vapor pressure of magnesium with respect to pure Mg and with respect to a 0.5 mol eutectic solution of Mg in Pb are shown by the solid lines, and for comparison the variations with respect to temperature of the vapor pressures of pure Sb, pure Bi, and pure Pb are shown by the dashed lines. From this figure, as shown by the exemplary ordinates and abscissae, it will be understood that the vapor pressure of the magnesium in the 0.5 mol eutectic solution of Mg in Pb at 700° C. is 0.77 torr, which is about one ninth of the vapor pressure of pure Mg at that temperature, which is about 6.7 torr. Also, in the case that the magnesium is in a state of eutectic solution in bismuth, tin, antimony, or a mixture of these various materials, likewise the vapor pressure of the magnesium drops as the activity drops, although this is not shown in FIG. 2.

In FIG. 3, in which weight percentage of Pb in a Mg-Pb mixture is shown along the horizontal axis (at the lower side of the figure), and melting point in °C. is shown along the vertical axis, the variation of the melting point of this Mg-Pb mixture is shown as the proportions vary. From this it will be understood that when the percentage by weight of lead is 0% (i.e., in the case of pure magnesium) the melting point is 650° C., but as the content of lead increases and the content of magnesium decreases the melting point of the eutectic solution drops, and for example when the mol partial ratio of magnesium is 0.5 the melting point is 480° C. Therefore, as compared with the previously described case wherein the retrievel metal is pure magnesium (i.e. as in the case in embodiments two, three, and four of the present invention), the temperature of the retrieval metal pool, when this is such a 50% mixture of lead and retrieved magnesium, can be set substantially lower; and this not only confers advantages in handling and in saving energy, but also keeps the vaporization loss of magnesium and the occurrence of the reverse or oxidization reaction low. FIG. 4 is a diagram similar to FIG. 3 showing the melting performance of Mg-Sn mixture, from which it will be understood that the same effect is available by using a Mg-Sn mixture as the retrieving mixture.

For instance, when magnesium is to be retrieved by using a retrieving molten metal bath of lead, and the mol ratio of the retrieved magnesium and lead in this retrieving metal bath is kept between zero and 0.5, then the melting point of the eutectic solution will be 480° C. at the maximum. If therefore the temperature of this molten retrieving metal bath is kept at 580° C., taking a margin of 100° C. over the maximum melting point for safety, then as seen from FIG. 2 the vapor pressure of the magnesium will be equal to 0.06 torr (with $x_i$ equal to 0.5 mol) or less, and a vaporization loss of one hundredth or less will occur, as compared with the case in which pure magnesium is used as the retrievel metal, in which case the vapor pressure of magnesium is 0.7 torr.

The elements which make up the molten retrieving metal pool, as described above, may be lead, bismuth, tin, antimony, or a mixture thereof, all of which can form a eutectic solution with the retrieved magnesium, and have effects as described above or similar. However, when the molten retrieving metal pool is composed of tin, the following reactions occur:

$$Sn + 2CO = SnO_2 + 2C \qquad (5)$$

$$SnO_2 + 2Mg = 2MgO + Sn \qquad (6)$$

According to the computation of the free energy of equation (5), tin turns into tin oxide by reacting with carbon monoxide at a temperature of 500° C. or lower, at an operating pressure of 6 torr, and at a temperature of 600° C. or less at atmospheric pressure, and magnesium is oxidized according to equation (6), with the result that if the molten retrieving metal pool is composed of tin then the lower limit of temperature allowable for operation is relatively high, as compared with the case of lead, bismuth, or a combination thereof. As for antimony, as shown by the curves of FIG. 2, its vapor pressure is relatively higher than those of lead, bismuth, or tin, and hence a greater vaporization loss will occur than in the case of those other elements.

Further, since the melting point of antimony is relatively high, as at 630° C., it is more difficult to be used as the retrieving metal, than the three other elements.

Therefore, as material for the retrieving molten metal pool, lead, bismuth, or a combination thereof is preferred. When these materials are used, the temperature of this molten retrieving metal pool is desired to be set in a range in which the properties of the drop in activity and drop in melting point due to the eutectic dissolution of the retrieved magnesium can be effectively utilized, i.e. a relatively low temperature range below the temperature at which the vaporization loss and the reverse or oxidization reaction become unacceptable but above the melting point of the alloy formed with the retrieved magnesium. Specifically, this temperature should be 250° to 850° C. in the case of a lead retrieving metal bath, 260° to 1000° C. in the case of a bismuth retrievingmetal bath, and 120° to 1200° C. in the case of a retrieving metal bath which is a combination of lead and bismuth.

One of the specific advantages of the method according to the present invention for retrieving metallic vapor is that the temperature and pressure conditions which are most appropriate for the operation of the reduction furnace for producing the metallic vapor can be set up substantially independently from the conditions in the retrieving chamber, which can be set up as being most appropriate for the retrieving of the metallic vapor, since the configuration of the convergent-divergent nozzle can be suitably adjusted. If as earlier suggested the convergent-divergent nozzle is used under the proper expansion condition, for example by additional injection of inert gas into the mixture gas upstream of the nozzle, then the density of the mixture gas as it squirts out from the nozzle, just before it collides with the molten retrieval metal, is kept high, since this jet flow is in a highly converged state, in terms of density. In this case, the density of the jet flow as it collides with the molten retrieval metal pool is desired to be 1.5 gm/m$^3$ or greater. In this case, the impact of the jet on the surface of the molten retrieving metal pool to agitate and mix it may well be sufficient, and then no mechanical stirring means for keeping the mixture well agitated will be necessary. Hence the volume of the retrieving metal pool can be kept small. On the other hand, when the convergent-divergent nozzle is being used under the insufficient expansion condition, then the jet flow continues to expand and cool after it has left the nozzle, and in this case although the speed with which the jet flow collides with the molten retrieval metal in fact increases the problem arises that its density becomes less. However, in this case, if an auxiliary device such as a vane wheel or reflecting plate is provided in the path of the jet flow, so as to absorb some of the kinetic energy of the jet flow and so as smoothly to lead the jet flow into the molten retrieval metal pool, no problems need arise. Additionally, it may be required to provide a stirrer for helping with the mixing of the retrieval metal pool, which requires this pool to be not very small, but this again need not cause any particular problem.

Next, a discussion will be made as to the most desirable values for the temperature and the pressure of the jet flow from the convergent-divergent nozzle, just before it collides with the surface of the molten retrieving metal pool.

In FIG. 5, in which temperature in degrees Centigrade is shown along the horizontal axis and pressure in torr is shown along the vertical axis logarithmically, there is shown a state diagram of magnesium. In this diagram, the solid lines denote the boundary between the solid, the liquid, and the gaseous states. When magnesium vapor is rapidly cooled by the convergent-divergent nozzle, it is supercooled into such states as shown by the dashed line in the figure. In order effectively to retrieve the magnesium into the molten retrieving metal in the liquid state, it is desired that the temperature and pressure of the jet flow from the convergent-divergent nozzle just as this jet flow enters the molten retrieving metal should be such that the magnesium vapor in said jet flow in the supercooled condition due to rapid cooling is easy to liquefy, and therefore the temperature of the jet flow at this point is preferred to be above 400° C. and more preferably between 490° and 650° C., and substantially equal to the temperature of the molten retrieval metal pool; while the pressure of the jet flow at this point is preferred to be greater than or equal to 3 torr, and more preferably is between 5 and 30 torr. The temperature and pressure of the jet flow may be adjusted to be within these ranges by suitably configuring the convergent-divergent nozzle, and by suitably adjusting the pressures upstream and downstream thereof, possibly also by introducing inert gas such as argon gas into the mixture gas upstream of the nozzle, as previously described.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 5 is a state diagram of magnesium, in which temperature in degrees Centigrade is shown along the horizonal axis and pressure in torr is shown along the vertical axis logarithmically, with the solid lines denoting the boundary between the solid, liquid, and gaseous states;

DESCRIPTION OF THE PREFERRED EMBODIMENTS

The present invention will now be described with reference to six preferred embodiments each of the apparatus and of the method thereof, and with reference to the appended drawings.

THE CONSTRUCTION OF THE FIRST APPARATUS EMBODIMENT

Figure 1:
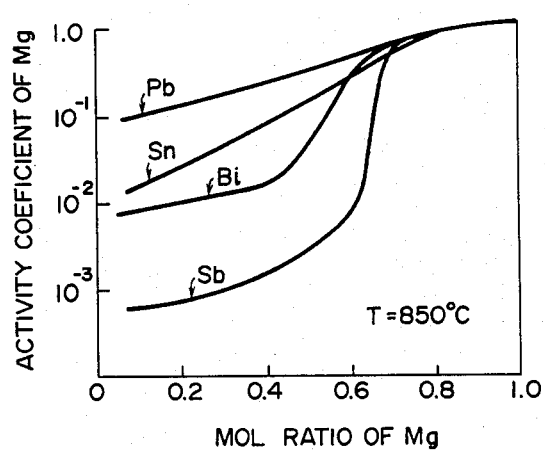
FIG. 1 is a graph, in which partial mol ratio of magnesium is shown along the horizontal axis, and the activity coefficient of the magnesium is shown logarithmically along the vertical axis, and in which four lines show the variation of activity coefficient of magnesium with respect to its partial mol ratio, when the magnesium is in a eutectic solution with, respectively, lead, bismuth, tin, and antimony, at a temperature of 850° C.
Figure 2:
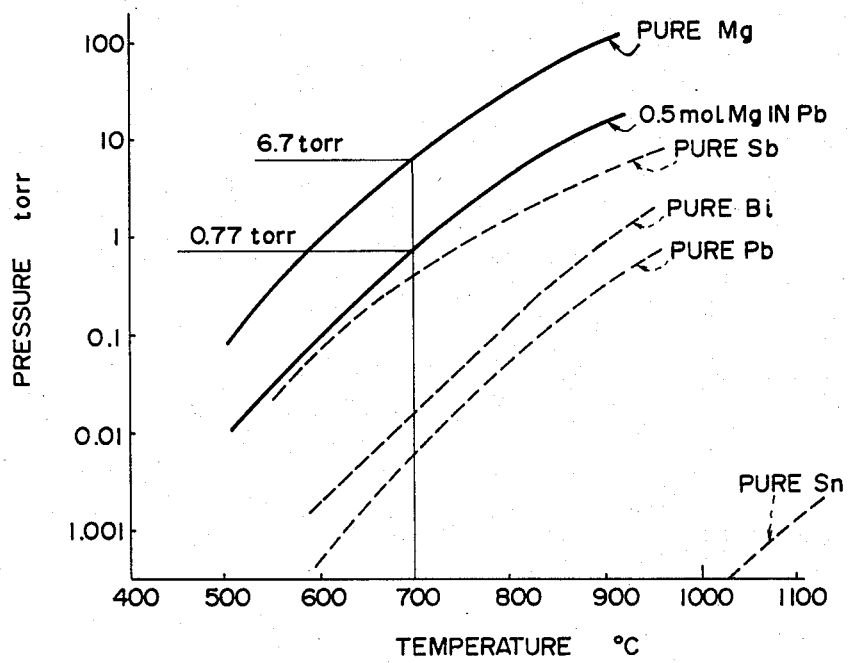
FIG. 2 is a graph, in which temperature in degrees centigrade is shown along the horizontal axis and vapor pressure in torr is shown logarithmically along the vertical axis, showing the variation with temperature of the vapor pressure of magnesium with respect to pure Mg and with respect to a 0.5 mol eutectic solution of Mg in Pb by the solid lines, and also showing for comparison the variations with respect to temperature of the vapor pressures of pure Sb, pure Bi, and pure Pb by the dashed lines.
Figure 3:
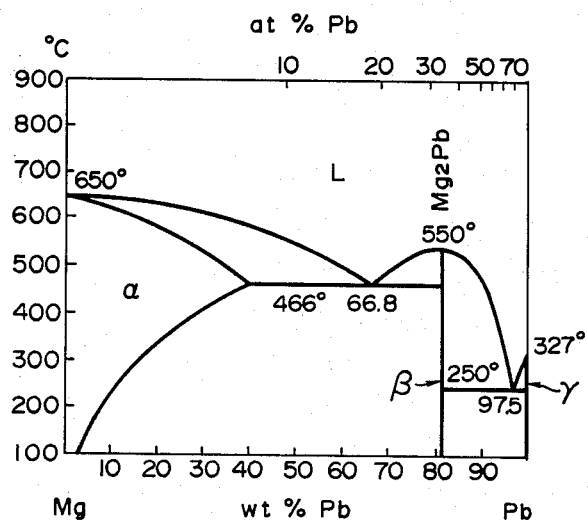
FIG. 3 is a graph, in which weight percentage of Pb in a Mg-Pb mixture is shown along the horizontal axis, and melting point of the mixture in ° C. is shown along the vertical axis, showing the variation of the melting point of this Mg-Pb mixture as the proportions vary.
Figure 4:
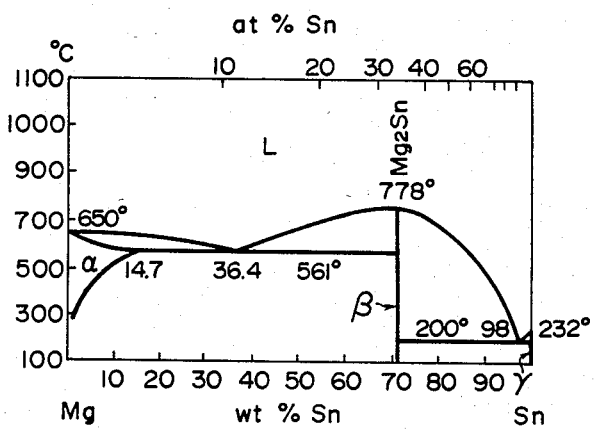
FIG. 4 is a graph, similar to FIG. 3, showing the case using Sn instead of Pb.
Figure 6:
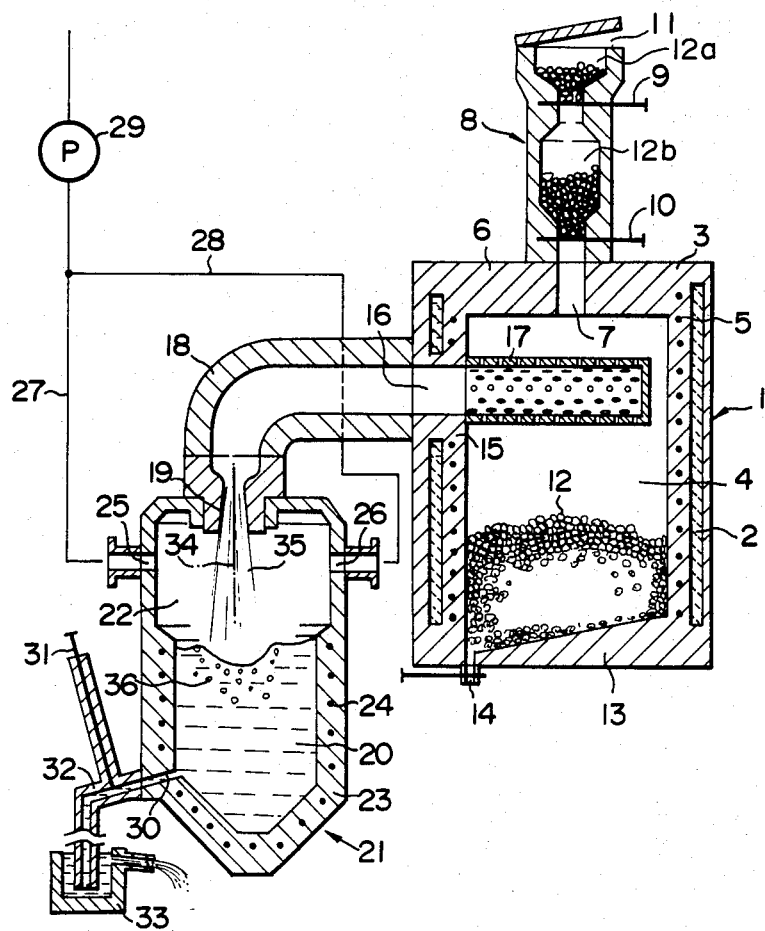
FIG. 6 is a schematic structural diagram, showing the first preferred embodiment of the apparatus according to the present invention for retrieving metal in the liquid phase from gas containing said metal as a vapor, which practices the first preferred embodiment of the method for retrieving metal in the liquid phase according to the present invention.

In FIG. 6 there is shown a schematic structural view of an apparatus for retrieving metal in the liquid phase from a gas containing vapor of the metal, according to the first preferred apparatus embodiment of the present invention, which is particularly applied to the reduction of zinc oxide by carbon as will be seen hereinafter, and which is used for practicing the first preferred embodiment of the method for retrieving metal in the liquid phase according to the present invention. In this figure, the reference numeral 1 generally denotes a reduction furnace which is substantially formed as a closed container, which has a furnace body 3 provided with a layer 2 of insulating material; and a furnace chamber 4 is defined as a cavity within this reduction furnace 1. A first heater 5 is embedded in the wall of the furnace chamber 4, generally around said furnace chamber 4 and within the layer 2 of insulating material, so as to heat up the furnace body 3 and said furnace chamber 4 defined therein with said layer 2 of insulating material providing an insulation function.

In the upper end wall 6 of the furnace chamber 4 there is provided a reaction material charging port 7, to which is connected the lower end of a lower charging chamber 12b of a reaction material charging hopper 8, the upper end of an upper charging chamber 12a of which is connected to a charging intake 11. Two control valves 9 and 10 are provided, respectively between the lower end of the upper charging chamber 12a and the upper end of the lower charging chamber 12b and between the lower end of the lower charging chamber 12b and the charging port 7, so that by opening and closing these control valves 9 and 10 in an alternating fashion as will be easily understood by one of ordinary skill in the art material for reaction may be charged into the reaction furnace chamber 4 through the charging port 7 without substantially deteriorating the gas tight condition of the reaction furnace chamber 4. In the lower end wall or bottom 13 of the furnace chamber 4 there is provided a reaction residue discharge port 14 which is controlled by a valve; in fact, again, a similar double valve arrangement is provided for discharging reaction residues produced in the chamber 4 of the furnace 1 by reduction (as will be explained later) through this reaction residue discharge port 14 without deteriorating the gas tight condition of the reaction furnace chamber 4, although this is not shown in the figure.

The side wall 15 of the furnace chamber 4 has a mixture gas discharge port 16 formed therein, and a mixture gas conduit 18 leads from this gas discharge port 16, with the interposition of a perforated filter tube 17, so as to communicate the furnace chamber 4 with a metallic vapor retrieving chamber 22 provided below and to the left as seen in the figure of the furnace chamber 4 within the furnace body 23 of a metallic vapor retrieving furnace 21. Particularly according to an important principle of the present invention, the downstream end of this conduit 18 is formed as a convergent-divergent nozzle or Laval nozzle 19 of the above described sort.

Within the lower part of the metallic vapor retrieving chamber 22, below and opposed to the lower end of the convergent-divergent nozzle 19, there is present during operation of the apparatus a pool 20 to molten retrieving metal. The lower part of the metallic vapor retrieving chamber 22 is communicated, via a molten metal take out port 30 and via a molten metal take out conduit 32 which is controlled by a control valve 31, to a ladle 33 for removing molten metal. A slag take out port not shown in the figure is also provided for removing slag from the surface of the pool 20 of molten retrieving metal in the retrieving chamber 22. Vacuum ports 25 and 26 are provided in the upper part of the retrieving chamber 22 and are connected, via vacuum conduits 27 and 28 respectively, to a vacuum pump 29, for evacuating the interior parts of the apparatus as a whole to appropriate vacuum levels, as described later. A second heater 24 is embedded in the wall of the furnace body 23 of the metallic vapor retrieving chamber 22, generally around said retrieving chamber 22, so as to heat up the body 23 of the retrieving furnace 21 and said retrieving chamber 22 defined therein.

Particularly according to a particular feature of this first apparatus embodiment of the present invention, the central axial line 34 of the convergent-divergent nozzle 19 extends in the metallic vapor retrieving chamber 22 substantially vertically, so that as explained later during operation of the nozzle 19 the spray or jet flow 35 of mixture gas including metal vapor from said nozzle 19 should impact substantially at right angles onto the surface of the pool 20 of molten retrieving metal in the lower part of the retrieving chamber 22.

The General Operation of the First Apparatus Embodiment

The shown apparatus according to the first preferred embodiment of the apparatus of the present invention is generally used as follows. First, material for reduction of an appropriate sort for producing gas vapor of a metal which is required to be recovered or retrieved as will be understood in detail later is charged into the furnace chamber 4 of the reduction furnace 1, by charging this material into the upper charging chamber 12a of the charging hopper 8 through the charging intake 11, and by then opening and closing the control valves 9 and 10 in an alternating fashion as outlined above so as to transfer this reduction material through the lower charging chamber 12b into the furance chamber 4 without allowing gas from the outside to enter the furnace chamber 4 in substantial amount. Then the first heater 5 is operated so as to heat up the furnace chamber 4 and the reaction material charged therein to a predetermined temperature $T_1$, so as to cause this reduction material to be reduced into a gas mixture containing vapor of the desired metal which is to be recovered or retrieved, said gas mixture being at a pressure $P_1$. This mixture gas then passes in the heated state through the opening 16 in the side wall 15 of the reduction furnace 1 and is then ejected from the furnace chamber 4, according to the difference of pressures between the interior of the furnace chamber 4 which is at said pressure $P_1$ and the interior of the metallic vapor retrieving chamber 22 which is kept at a pressure $P_2$ substantially lower than the pressure $P_1$, through the conduit 18 and through the convergent-divergent nozzle 19 at the downstream end of said conduit 18, into the metallic vapor retrieving chamber 22, and sprays out of the convergent-divergent nozzle 19 as a jet 35 which impinges against the surface of the pool 20 of molten retrieving metal in the bottom of said retrieving chamber 22. As this mixture gas passes through the convergent-divergent nozzle 19, it reaches a supersonic speed and expands adiabatically very quickly, and thus the metal vapor is very quickly cooled down by this adiabatic expansion to a second temperature $T_2$, and may be at least partly condensed into fine metal droplets or particles. This cooling down is so quick that it occurs without said metal vapor having a chance to recombine with other constituents of said mixture gas (i.e., to be again oxidized thereby), due to the very quick cooling of said mixture gas, and the final second temperature $T_2$ down to which the mixture gas is cooled by the adiabatic expansion in the convergent-divergent nozzle 19 is so low as to be below the temperature at which the recombination or reoxidization reaction can substantially take place.

The jet 35 including cooled metallic vapor and possibly fine particles of liquid or solid metal thus produced impinges on the surface of the pool 20 of molten retrieving metal in the bottom of said retrieving chamber 22, in this first preferred embodiment substantially perpendicularly, and the metal in said jet 35 becomes mixed with and entrained into the molten retrieving metal. Bubbles 36 of gas from the jet may become temporarily entrained below the surface of the pool 20 of molten retrieving metal, but this need not cause any substantial problem. The retrieving chamber 22 is maintained at its pressure $P_2$ by the remainder gas from the jet 35 being sucked out of said retrieving chamber 22, via the ports 25 and 26 and the conduits 27 and 28, by the operation of the vacuum pump 29. The sucking rate of the pump 29 thus is controlled so as to maintain the pressures in the furnace chamber 4 and in the metallic vapor retrieving chamber 22 at substantially their respective desired values $P_1$ and $P_2$, according of course also to various other parameters of the apparatus and its operation.

From time to time, some of the retrieving molten metal pool 20 in the bottom portion of the metallic vapor retrieving chamber 22, with retrieved metal from the jet 35 entrained therein, is removed via the port 30 and the conduit 32 by operation of the valve 31 into the ladle 33, without disturbing the depressurized state of the apparatus. Further, from time to time, some of the slag in the bottom portion of the furnace chamber 4 is removed via the port 14 by operation of the valve, again without disturbing the depressurized state of the apparatus.

Description of the First Method Embodiment

The first preferred apparatus embodiment of the present invention described above was operated by charging a mixture of zinc oxide powder (which in fact was made by oxidizing zinc sulphide and refining it) and carbon formed into lumps as a raw material for reduction into the furnace chamber 4 of the reduction furnace 1, by operating the vacuum pump 29, by operating the first heater 5, by charging zinc metal into the metallic vapor retrieving chamber 22, and by melting said zinc metal into a pool 20 of retrieving molten metal for retrieving the zinc produced by reduction in the reduction furnace 1. Thus, in this embodiment, the retrieving metal (zinc) used for the retrieving metal pool 20 was the same metal as the metal (zinc) which was to be retrieved. The temperature $T_1$ to which the furnace chamber 4 and the reduction material charged thereinto were heated was 950° to 1050° C., and the rate of suction of the vacuum pump 29 was controlled so as to keep the pressure $P_1$ within the furnace chamber 4 at approximately 450 to 550 torr and so as to keep the pressure $P_2$ within the metallic vapor retrieving chamber 22 at approximately 50 to 90 torr. The second heater 24 was so operated as to keep the temperature within the metallic vapor retrieving chamber 22 at about 500° C., so as to keep the retrieving metal pool 20 of zinc metal therein in the molten state.

As explained above, the zinc oxide in the reaction chamber 4 of the reduction furnace 1 was reduced by the carbon, so as to produce metallic zinc in vapor form and oxidizing gas such as carbon monoxide and carbon dioxide, and this mixture of metallic zinc vapor and oxidizing gas then flowed out through the conduit 18 and through the convergent-divergent nozzle 19 into the metallic vapor retrieving chamber 22, attaining a supersonic speed as it passed through the convergent-divergent nozzle 19. In fact, in this first embodiment, the nozzle 19 was functioning under the insufficient expansion condition. The jet flow 35 thus produced was quickly cooled down by adiabatic expansion in the nozzle 19 to below the temperature at which the reverse reaction of the oxidizing gas oxidizing the zinc vapor could occur, and impinged against the surface of the molten retrieving zinc metal pool 20 within the metallic vapor retrieving chamber 22, and the zinc vapor (which in fact was partially liquefied and/or solidified) in said jet flow was entrained into and mixed with the molten zinc metal pool 20.

The entrained zinc was then of course brought to the liquefied state by this entrainment into the retrieving metal pool, and remained therein; and the oxidizing gas in the mixture then, after plunging into the molten zinc pool 20 and temporarily formed bubbles such as the shown bubbles 36 in the molten zinc pool 20, rose to the surface and was sucked away by the vacuum pump 29. The retrieved zinc was removed from the apparatus from time to time as explained above. The depression of the liquid surface of the pool 20 of molten retrieving zinc metal was about 50 mm. The throat diameter of the convergent-divergent nozzle 19 was 25 mm. The physical condition of the raw material charged into the reduction furnace chamber 4 was lump briquette. The retrieval ratio was 99.3%. The average purity of the retrieved zinc was 98.0%.

The results described above of operating the first embodiment of the apparatus of the present invention according to the first preferred embodiment of the method of the present invention show that in the case of a metal such as zinc, which has a relatively low melting point, and which has a relatively low tendency to become reoxidized, a good result of retrieving metallic vapor from the gas products of a reduction reaction can be obtained, with a purity and a retrieval ratio both close to 100%, even without the use of any device such as a collision plate or the like for slowing down the speed of the jet flow from the convergent-divergent nozzle.

The Construction of the Second Apparatus Embodiment

Figure 7:
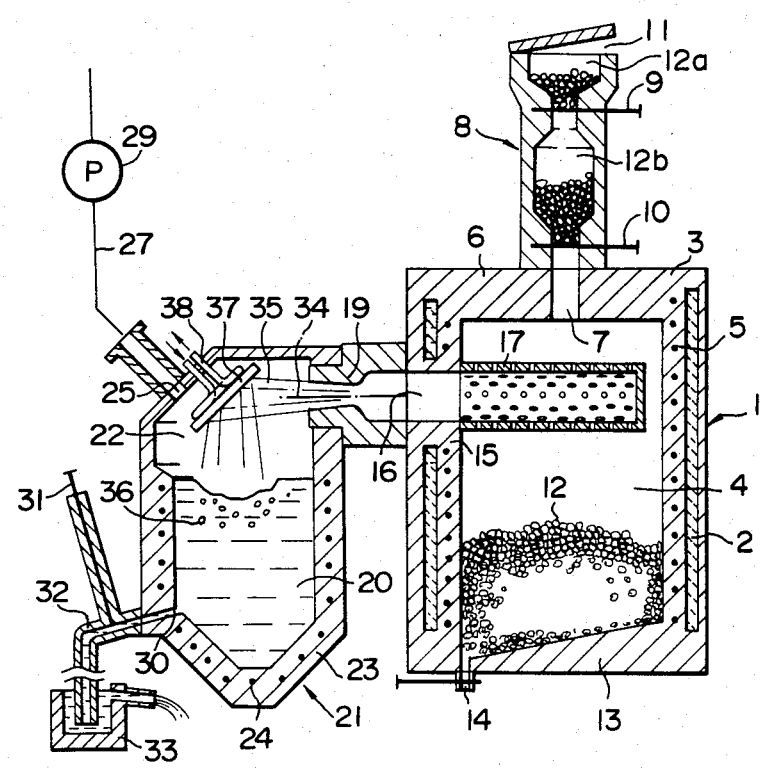
FIG. 7 is a schematic structural diagram, similar to FIG. 8, showing the second preferred embodiment of the apparatus according to the present invention for retrieving metal in the liquid phase, which practices the second preferred embodiment of the method for retrieving metal according to the present invention.

FIG. 7 is a schematic skeleton structural view of an apparatus for retrieving metal in the liquid phase which is a second preferred embodiment of the apparatus according to the present invention. In this figure, parts of the second preferred apparatus embodiment shown, which correspond to parts of the first preferred apparatus embodiment shown in FIG. 6, and which have the same functions, are designated by the same reference numerals and symbols as in that figure.

In this second preferred embodiment, the construction of the reduction furnace 1, and of the charging hopper 8 and so on, is quite the same, as in the first preferred embodiment shown in FIG. 6. Further, the lower part of the metallic vapor retrieving chamber 22, and the arrangements including the conduit 32 for removing molten metal therefrom, are also quite the same as in the first embodiment. However, according to a particular feature of this second apparatus embodiment of the present invention the convergent-divergent nozzle 19 extends into the upper part of the metallic vapor retrieving chamber 22 and opens therein in such an orientation that its central axial line 34 extends, not vertically as in the case of the first preferred embodiment, but horizontally, so that as explained later during operation of the nozzle 19 the spray or jet flow 35 of mixture gas including metal vapor from said nozzle 19 is squirted substantially parallel to the surface of the pool 20 of molten retrieving metal in the lower part of the retrieving chamber 22. Further, directly opposed to said nozzle 19 there is provided in the upper part of the metallic vapor retrieving chamber 22 a deflection plate 37, angled with respect to the central axial line 35 of the nozzle 19, with said inclination angle being adjustable between about 45° and about 60°. Further, the front surface or the right surface in the figure of the deflection plate 37 is formed in a concaved shape, and a cooling water conduit 38 is provided for supplying cooling water to the rear side of said deflection plate 37. Thus, when a jet flow 35 of gas is squirting out of the nozzle 19, this deflection plate is able to deflect this jet flow, as schematically shown in the figure, through an angle of approximately 90°, so as to direct it down with a flow of substantially reduced force against the surface of the molten retrieving metal pool 20 in the retrieving chamber 22, with the concave surface of the deflection plate 37 performing a focusing action on said deflected jet flow so as to keep it together and prevent it from dispersing.

The General Operation of the Second Apparatus Embodiment

The shown apparatus according to the second preferred embodiment of the apparatus of the present invention is generally used as follows, in a manner basically similar to the operation of the first apparatus embodiment. First, material for reduction of an appropriate sort for producing gas vapor of a metal which is required to be recovered or retrieved as will be understood in detail later is charged into the furnace chamber 4 of the reduction furnace 1, as before. Then the first heater 5 is operated so as to heat up the furnace chamber 4 and the reaction material charged therein to a predetermined temperature $T_1$, so as to cause this reduction material to be reduced into a gas mixture containing vapor of the desired metal which is to be recovered or retrieved, said gas mixture being at a pressure $P_1$, again as before. This mixture gas then passes in the heated state through the opening 16 in the side wall 15 of the reduction furnace 1 and is then ejected from the furnace chamber 4, according to the difference of pressures between the interior of the furnace chamber 4 which is at said pressure $P_1$ and the interior of the metallic vapor retrieving chamber 22 which is kept at a pressure $P_2$ substantially lower than the pressure $P_1$, through the conduit 18 and through the convergent-divergent nozzle 19 at the downstream end of said conduit 18, into the metallic vapor retrieving chamber 22, and sprays out of the convergent-divergent nozzle 19 as a jet 35 which passes substantially horizontally, this time, to impinge against the right side surface in the figure of the deflection plate 37, and to be reflected thereof, being deflected through an angle of approximately 90° as described above, so as then to impact substantially in the vertical direction on the surface of the pool 20 of molten retrieving metal in the bottom of said retrieving chamber 22, with the speed of said jet being substantially diminished by said reflection action. As before, as the mixture gas passes through the convergent-divergent nozzle 19, it reaches a supersonic speed and expands adiabatically very quickly, and thus the metal vapor is very quickly cooled down by this adiabatic expansion to a second temperature $T_2$, and may be at least partly condensed into fine metal droplets or particles. This cooling down is so quick that it occurs without said metal vapor having a chance to recombine with other constituents of said mixture gas (i.e., to be again oxidized thereby), due to the very quick cooling of said mixture gas, and the final second temperature $T_2$ down to which the mixture gas is cooled by the adiabatic expansion in the convergent-divergent nozzle 19 is so low as to be below the temperature at which the recombination or reoxidization reaction can substantially take place.

Again, when the deflected jet 35 including cooled metallic vapor and possibly fine particles of liquid or solid metal thus produced impinges on the surface of the pool 20 of molten retrieving metal in the bottom of said retrieving chamber 22, now substantially perpendicularly, again the metal in said jet 35 becomes mixed with and entrained into the molten retreiving metal. Again, bubbles 36 of gas from the jet may become temporarily entrained below the surface of the pool 20 of molten retreiving metal, but this need not cause any substantial problem. The retrieving chamber 22 is maintained at its pressure $P_2$ by the remainder gas from the jet 35 being sucked out of said retrieving chamber 22, via the port 25 and the conduit 27, by the operation of the vacuum pump 29. The sucking rate of the pump 29 thus is again controlled so as to maintain the pressures in the furnace chamber 4 and in the metallic vapor retrieving chamber 22 at substantially their respective desired values $P_1$ and $P_2$, according of course also to various other parameters of the apparatus and its operation.

Similarly to the operation of the first preferred embodiment, from time to time, some of the retrieving molten metal pool 20 in the bottom portion of the metallic vapor retrieving chamber 22, with retrieved metal from the jet 35 entrained therein, is removed via the port 30 and the conduit 32, as before.

Description of the Second Method Embodiment

The second preferred apparatus embodiment of the present invention described above was operated by charging a mixture of magnesium oxide powder and carbon formed into lumps as a raw material for reduction into the furnace chamber 4 of the reduction furnace 1, by operating the vacuum pump 29, by operating the first heater 5, by charging magnesium metal into the metallic vapor retrieving chamber 22 as a retrieving metal, and by melting said magnesium metal into a pool 20 of retrieving molten metal for retrieving the magnesium produced by reduction in the reduction furnace 1. Thus, in this second preferred embodiment, the retrieving metal (magnesium) used for the retrieving metal pool 20 was again the same metal as the metal (magnesium) which was to be retrieved. The temperature $T_1$ to which the furnace chamber 4 and the reduction material charged thereinto were heated was 1750° to 1850° C., and the rate of suction of the vacuum pump 29 was controlled so as to keep the pressure $P_1$ within the furnace chamber 4 at approximately 50 to 70 torr and so as to keep the pressure $P_2$ within the metallic vapor retrieving chamber 22 at approximately 10 to 70 torr. The second heater 24 was so operated as to keep the temperature within the metallic vapor retrieving chamber 22 at about 700° C., so as to keep the retrieving metal pool 20 of magnesium metal therein in the molten state.

As explained above, the magnesium oxide in the reaction chamber 4 of the reduction furnace 1 was reduced by the carbon, so as to produce metallic magnesium in vapor form and oxidizing gas such as carbon monoxide, and this mixture of metallic magnesium vapor and oxidizing gas then flowed out through the conduit 18 and through the convergent-divergent nozzle 19 into the metallic vapor retrieving chamber 22, attaining a supersonic speed as it passed through the convergent-divergent nozzle 19. The jet flow 35 produced was thus quickly cooled down by adiabatic expansion in the nozzle 19 to below the temperature at which the reverse reaction of the oxidizing gas oxidizing the magnesium vapor could occur, and first impinged against the face of the deflection plate 37, to be reflected or deflected at an angle of approximately 90° off this deflection plate 37 to then impact at reduced speed against the surface of the molten retrieving magnesium metal pool 20 within the metallic vapor retrieving chamber 22, and the magnesium vapor in said jet flow was entrained into and mixed with the molten magnesium metal pool 20.

The entrained magnesium was of course brought to the liquefied state by this entrainment into the retrieving molten magnesium metal pool, and remained therein; and the oxidizing gas in the mixture then, after plunging into the molten magnesium pool 20 and temporarily forming bubbles such as the shown bubbles 36 in the molten magnesium pool 20, rose to the surface and was sucked away by the vacuum pump 29. The reduction of the speed of the jet flow 35 including the magnesium vapor, caused by the deflection plate 37, ensured that the surface of the molten magnesium retrieving metal pool 20 was not too severely splashed about by too violent an impact of said jet flow thereagainst, and also that the magnesium vapor in the jet was not dispersed sideways upon impact with the molten magnesium surface. The retrieved magnesium was again removed from the apparatus from time as explained above. In detail, the depression of the liquid surface of the pool 20 of molten retrieving magnesium metal was about 30 to 50 mm, and substantially no splash of molten metal from the surface of the molten magnesium pool 20 occurred. The throat diameter of the convergent-divergent nozzle 19 was 25 mm, the physical condition of the raw material charged into the reduction furnace 1 was again lump briquette. The angle of the deflection plate 37 was 55°. The retrieval ratio was 90 to 95%. The average purity of the retrieved magnesium was 92.3%.

The results described above of operating the second preferred embodiment of the apparatus of the present invention according to the second preferred embodiment of the method of the present invention show that even in the case of a metal such as magnesium, which has a relatively high melting point, and which has a relatively high tendency to become reoxidized, a good result of retrieving metallic vapor from the gas products of a reduction reaction can be obtained, with a purity and a retrieval ratio both better than in the case of any conventionally known method, by the use of the shown collision plate for slowing down the speed of the jet flow from the convergent-divergent nozzle.

Figure 8:
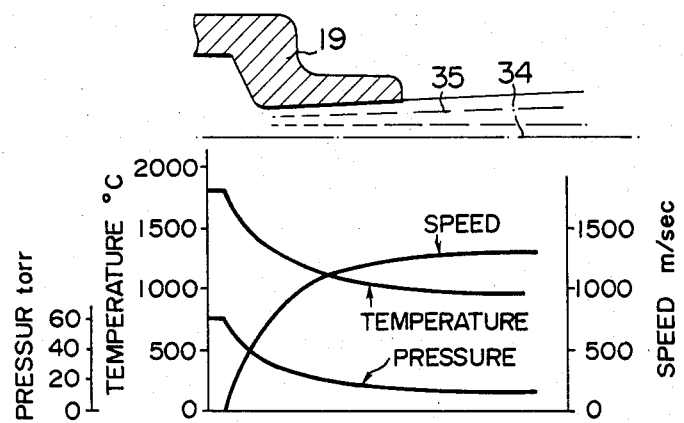
FIG. 8 is a combination of three graphs, in all of which distance along the central axial line of an exemplary convergent-divergent nozzle (which is also shown in the figure in a schematic way) is shown along the horizontal axis, and in which respectively pressure in torr, temperature in degrees centigrade, and speed in meters per second of a mixture gas flowing through the nozzle are shown along the vertical axis.
Figure 9A:
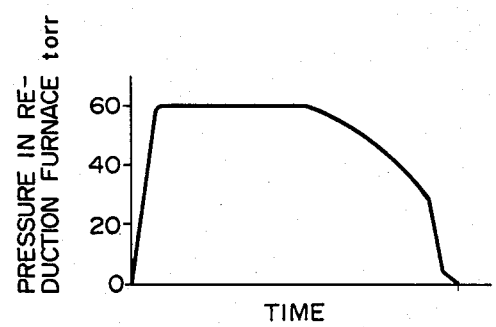
FIGS. 9a and 9b are schematic graphs, in both of which time is shown along the horizontal axis, and in which respectively pressure in torr and retrieval ratio in percent are shown along the vertical axis, showing the changes with time in the value of the pressure in a reduction furnace and in the retrieval ratio of metallic vapor, according to the second preferred embodiment of the method of the present invention.
Figure 9B:
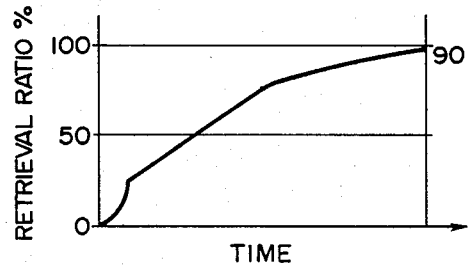

In FIG. 8, there are shown the values of the pressure, the temperature, and the speed of the mixture gas as it flows along through an exemplary convergent-divergent nozzle 19 used in the above described second embodiment (illustrated at the top of FIG. 8) the diameter of whose inlet opening is 50 mm, the diameter of whose throat is 25 mm, the diameter of whose outlet opening is 28 mm, and the length of which from the inlet opening to the outlet opening is 60 mm. The figure is a combination of three graphs, in all of which distance along the central axial line of the nozzle is shown along the horizontal axis, and in which respectively pressure in torr, temperature in degrees centigrade, and speed in meters per second are shown along the vertical axis. Further, FIGS. 9a and 9b are schematic graphs showing the changes in the values of the pressure in the reduction furnace 1 and the retrieval ratio (i.e., retrieved molten metal weight divided by theoretical retrieval amount) with time, in a batch test of a theoretical retrieval amount of 6 kg of magnesium conducted in the manner described above according to the second preferred embodiment of the method of the present invention, using the above described convergent-divergent nozzle. By comparing the above described experiment of retrieving magnesium vapor and this bath test, it can be seen that the method and the device for retrieving metallic vapor according to the second embodiment of the present invention can effectively retrieve magnesium vapor at high retrieval ratio even when operated in batch mode, although continuous operation is to be preferred. Conceivably, the reason for the fact that the method and the device for retrieving metallic vapor according to the second embodiment of the present invention showed a lower retrieval ratio when operated in the batch mode than when operated in the continuous mode is that part of the magnesium vapor adhered in solid form to the face of the deflection plate 37, and that this solidified magnesium was not measured as part of the retrieved magnesium metal.

The Construction of the Third Apparatus Embodiment

Figure 10:
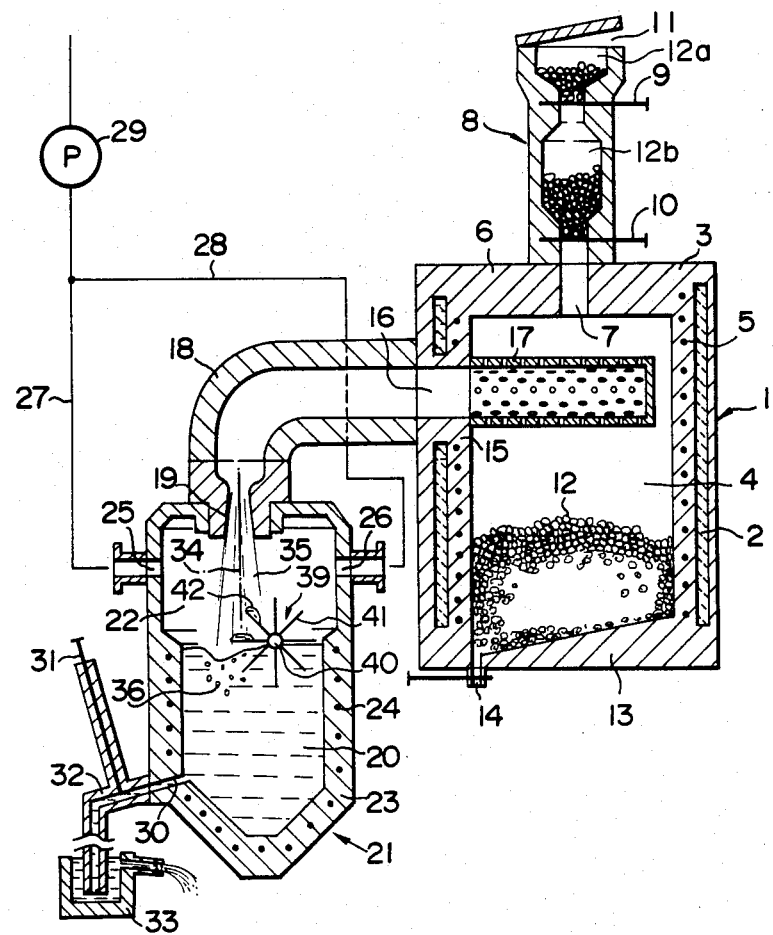
FIG. 10 is a schematic structural diagram, similar to FIGS. 8 and 9, showing the third preferred embodiment of the apparatus according to the present invention for retrieving metal in the liquid phase, which practices the third preferred embodiment of the method for retrieving metal according to the present invention.

FIG. 10 is a schematic skeleton structural view of an apparatus for retrieving metal in the liquid phase which is a third preferred embodiment of the apparatus according to the present invention. In this figure, parts of the third preferred apparatus embodiment shown, which correspond to parts of the first and second preferred apparatus embodiments shown in FIGS. 6 and 7, and which have the same functions, are designated by the same reference numerals and symbols as in those figures.

In this third preferred embodiment, the construction of the reduction furnace 1, and of the charging hopper 8 and so on, and of the metallic vapor retrieving chamber 22 as a whole, is the same, as in the first preferred embodiment shown in FIG. 6; and as in the first preferred apparatus embodiment the convergent-divergent nozzle 19 extends into the upper part of the metallic vapor retrieving chamber 22 and opens therein in such an orientation that its central axial line 34 extends vertically. The only difference is that, directly opposed to said nozzle 19, there is provided in the central part of the metallic vapor retrieving chamber 22, a vane wheel 39, which is structured with a horizontally rotatably mounted hub 40 and a plurality of vanes 41 projecting therefrom. The vane wheel 39 is rotatably mounted with the vanes 41 on its lower part at least partially submerged under the surface of the pool 20 of molten retrieving metal in the metallic vapor retrieving chamber 22, and with those of its vanes 41 on its left part in FIG. 10 directly opposed to the convergent-divergent nozzle 19, in its axial line. Thus, when a jet flow 35 of gas is squirting out of the nozzle 19, a major part of the metallic vapor in this jet flow impinges against these vanes 41 of the vane wheel 39 and sticks thereto in liquid form, as schematically shown in the figure, so as to cause the vane wheel 39 as a whole to rotate in the counterclockwise direction in the figure. Thus this rotation of the vane wheel 39 gently brings this molten metal under the surface of the molten retrieving metal pool 20 in the retrieving chamber 22, so that the metal is retrieved by the metal pool 20 in a relatively gentle manner.

Description of the Third Method Embodiment

The third preferred apparatus embodiment of the present invention described above was operated, substantially in the same way as in the case of the second preferred embodiment, by charging a mixture of magnesium oxide powder and carbon formed into lumps as a raw material for reduction into the furnace chamber 4 of the reduction furnace 1, by operating the vacuum pump 29, by operating the first heater 5, by charging magnesium metal into the metallic vapor retrieving chamber 22 as a retrieving metal, and by melting said magnesium metal into a pool 20 of retrieving molten metal for retrieving the magnesium produced by reduction in the reduction furnace 1. Thus, in this third preferred embodiment, the retrieving metal (magnesium) used for the retrieving metal pool 20 was again the same metal as the metal (magnesium) which was to be retrieved. The temperature $T_1$ to which the furnace chamber 4 and the reduction material charged thereinto were heated was again 1750° to 1850° C., and the rate of suction of the vacuum pump 29 was controlled so as to keep the pressure $P_1$ within the furnace chamber 4 at approximately 50 to 70 torr and so as to keep the pressure $P_2$ within the metallic vapor retrieving chamber 22 at approximately 5 to 10 torr, in this case.

The second heater 24 was again so operated as to keep the temperature within the metallic vapor retrieving chamber 22 at about 700° C., so as to keep the retrieving metal pool 20 of magnesium metal therein in the molten state.

As before, the magnesium oxide in the reaction chamber 4 of the reduction furnace 1 was replaced by the carbon, so as to produce metallic magnesium in vapor form and oxidizing gas such as carbon monoxide, and this mixture of metallic magnesium vapor and oxidizing gas then flowed out through the conduit 18 and through the convergent-divergent nozzle 19 into the metallic vapor retrieving chamber 22, attaining a supersonic speed as it passed through the convergent-divergent nozzle 19. The jet flow 35 produced was thus quickly cooled down by adiabatic expansion in the nozzle 19 to below the temperature at which the reverse reaction of the oxidizing gas oxidizing the magnesium vapor could occur, and first impinged against the vanes 41 of the vane wheel 39, so as to be collected thereon in the liquid state, thereafter to be brought relatively smoothly and gently under the surface of the molten retrieving magnesium metal pool 20 within the metallic vapor retrieving chamber 22, and thus the magnesium vapor in said jet flow was entrained into and mixed with the molten magnesium metal pool 20, and remained therein; and the oxidizing gas in the mixture, after plunging into the molten magnesium pool 20 and temporarily forming bubbles such as the shown bubbles 36 in the molten magnesium pool 20, rose to the surface and was sucked away by the vacuum pump 29. The reduction of the speed of the jet flow 35 including the magnesium vapor caused by the vane wheel 39, again ensured that the surface of the molten magnesium retrieving metal pool 20 was not too severely splashed about by too violent an impact of said jet flow 35 thereagainst, and also that the magnesium vapor in the jet was not disperesed sideways upon impact with the molten magnesium surface. The retrieved magnesium was again removed from the apparatus from time to time as explained above. In fact, the results described above the operating the third preferred embodiment of the apparatus of the present invention according to the third preferred embodiment of the method of the present invention were substantially the same as in the case of the second preferred embodiments of the device and the method of the present invention, described above.

The Construction of the Fourth Apparatus Embodiment

Figure 11:
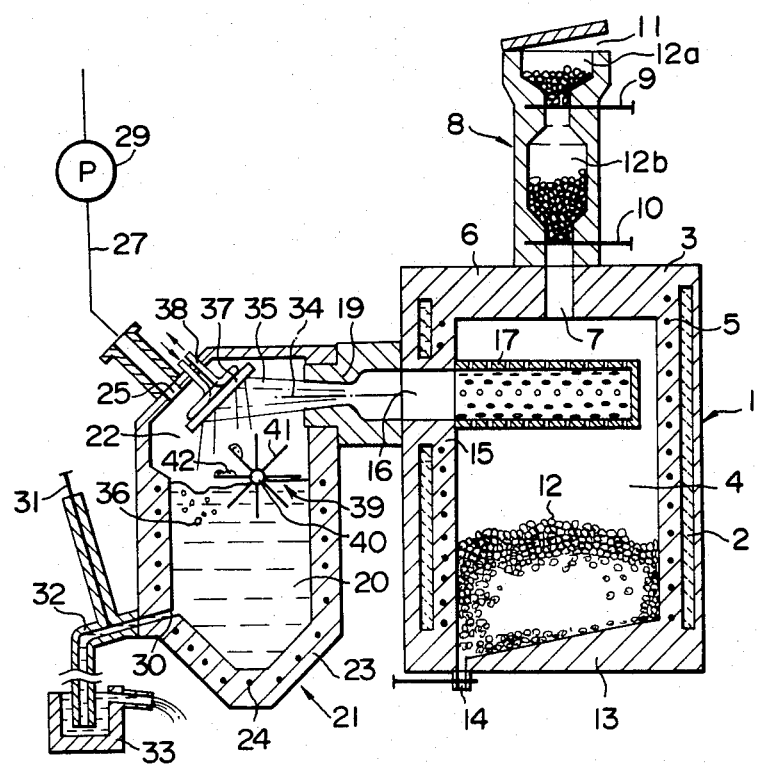
FIG. 11 is a schematic structural diagram, similar to FIGS. 8, 9, and 10, showing the fourth preferred embodiment of the apparatus according to the present invention for retrieving metal in the liquid phase, which practices the fourth preferred embodiment of the method for retrieving metal according to the present invention.

FIG. 11 is a schematic skeleton structual view of an apparatus for retrieving metal in the liquid phase which is a fourth preferred embodiment of the apparatus according to the present invention. In this figure, parts of the fourth preferred apparatus embodiment shown, which correspond to parts of the first through third preferred apparatus embodiments shown in FIGS. 6, 7, and 10, and which have the same functions, are designated by the same reference numerals and symbols as in those figures.

In this fourth preferred embodiment, the construction of the reduction furnace 1, and of the charging hopper 8 and so on, and of the metallic vapor retrieving chamber 22 as a whole, is the same, as in the second preferred embodiment shown in FIG. 7; and as in the second preferred apparatus embodiment the covergent-divergent nozzle 19 extends into the upper part of the metallic vapor retrieving chamber 22 and opens therein in such an orientation that its central axial line 34 extends horizontally, so that the jet flow from said nozzle 19 impacts against a deflection plate 37. However, in this fourth preferred embodiment, the difference is that further a vane wheel 39 of the same construction as in the case of the third preferred embodiment is additionally provided, as directly opposed to the deflected jet flow from said deflection plate 37. Again, the vane wheel 39 is structured with a horizontally rotatably mounted hub 40 and a plurality of vanes 41 projecting therefrom, and is rotatably mounted with the vanes 41 on its lower part at least partially submerged under the surface of the pool 20 of molten retrieving metal in the metallic vapor retrieving chamber 22, and with those of its vanes 41 on its left part in FIG. 11 directly opposed to the deflected jet flow from the deflection plate 37. Thus, when a jet flow 35 of gas is squirting out of the nozzle 19, first this jet flow is deflected by the deflection plate 37, and then a major part of the metallic vapor in this deflected and slowed down jet flow impinges against these vanes 41 of the vane wheel 39 and sticks thereto in liquid form, as schematically shown in the figure, so as to cause the vane wheel 39 as a whole to rotate in the counterclockwise direction in the figure. Thus this rotation of the vane wheel 39 gently brings this molten metal under the surface of the molten retrieving metal pool 20 in the retrieving chamber 22, so that the metal is retrieved by the metal pool 20 in a relatively gentle manner. Thus this fourth preferred apparatus embodiment is, conceptually, the combination of the second and the third preferred embodiments.

Description of the Fourth Method Embodiment

The fourth preferred apparatus embodiment of the present invention described above was operated, substantially in the same way as in the case of the third preferred embodiment, by charging a mixture of magnesium oxide powder and carbon formed into lumps as a raw material for reduction into the furnace chamber 4 of the reduction furnace 1, by operating the vacuum pump 29, by operating the first heater 5, by charging magnesium metal into the metallic vapor retrieving chamber 22 as a retrieving metal, and by melting said magnesium metal into a pool 20 of retrieving molten metal for retrieving the magnesium produced by reduction in the reduction furnace 1. Thus, in this fourth preferred embodiment, the retrieving metal (magnesium) used for the retrieving metal pool 20 was again the same metal as the metal (magnesium) which was to be retrieved. The temperature $T_1$ to which the furnace chamber 4 and the reduction material charged thereinto were heated was again 1750° to 1850° C., and the rate of suction of the vacuum pump 29 was controlled so as to keep the pressure $P_1$ within the furnace chamber 4 at approximately 30 to 50 torr and so as to keep the pressure $P_2$ within the metallic vapor retrieving chamber 22 at approximately 5 to 10 torr. The second heater 24 was again so operated as to keep the temperature within the metallic vapor retrieving chamber 22 at about 700° C., as to keep the retrieving metal pool 20 of magnesium metal therein in the molten state.

As before, the magnesium oxide in the reaction chamber 4 of the reduction furnace 1 was reduced by the carbon, so as to produce metallic magnesium in vapor form and oxidizing gas such as carbon monoxide, and this mixture of metallic magnesium vapor and oxidizing gas then flowed out through the conduit 18 and through the convergent-divergent nozzle 19 into the metallic vapor retrieving chamber 22, attaining a supersonic speed as it passed through the convergent-divergent nozzle 19. The jet flow 35 produced was thus quickly cooled down by adiabatic expansion in the nozzle 19 to below the temperature at which the reverse reaction of the oxidizing gas oxidizing the magnesium vapor could occur, and first impinged against the deflection plate 37, so as to be deflected and slowed thereby, and then impinged against the vanes 41 of the vane wheel 39, so as to be collected thereon in the liquid state, thereafter to be brought relatively smoothly and gently under the surface of the molten retrieving magnesium metal pool 20 within the metallic vapor retrieving chamber 22, and thus the magnesium vapor in said jet flow was entrained into and mixed with the molten magnesium metal pool 20, and remained therein; and the oxidizing gas in the mixture, after plunging into the molten magnesium pool 20 and temporarily forming bubbles such as the shown bubbles 36 in the molten magnesium pool 20, rose to the surface and was sucked away by the vacuum pump 29. The two phase reduction of the speed of the jet flow 35 including the magnesium vapor, first caused by the deflection plate 37 and then secondarily caused by the vane wheel 39, very positively ensured that the surface of the molten magnesium retrieving metal pool 20 was not too severely splashed about by too violent an impact of said jet flow 35 thereagainst, and also that the magnesium vapor in the jet was not dispersed sideways upon impact with the molten magnesium surface. The retrieved magnesium was again removed from the apparatus from time to time as explained above.

The throat diameter of the convergent-divergent nozzle 19 was 28 mm. The physical condition of the raw material charged into the reduction furnace 1 was again lump briquette. The angle of the deflection plate 37 was 55°. The retrieval ratio was 93 to 96%. The average purity of the retrieved magnesium was 93.3%.

The results described above the operating the fourth preferred embodiment of the apparatus of the present invention according to the fourth preferred embodiment of the method of the present invention are better than the results obtained in the cases of the second and the third preferred embodiments, and thus show that, in the case of a metal such as magnesium, which has a relatively high melting point, and which has a relatively high tendency to become reoxidized, the best results of retrieving metallic vapor from the gas products of a reduction reaction can be obtained, with a purity and a retrieval ratio both better than in the case of any conventionally known method, by the use of both a collision plate for slowing down the speed of the jet flow from the convergent-divergent nozzle and also a vane wheel for gently bringing the metal vapor into the molten retrieving metal pool.

Remarks Relative to the First Through the Fourth Embodiments

With regard to the above described first through fourth preferred embodiments of the method according to the present invention, in which the molten metal pool 20 used for retrieving the metallic vapor from the mixture gas squirted out from the convergent-divergent nozzle 19 is composed of the same metal as said metallic vapor, as an operational procedure this pool of molten retrieving metal may be prepared in the earlier stages of metal retrieval by either (a) capturing and storing the metallic vapor in the mixture gas which has flowed into the metallic vapor retrieving chamber 22 at the bottom of said chamber 22; or (b) charging metal prepared separately beforehand.

The Construction of the Fifth Apparatus Embodiment

Figure 12:
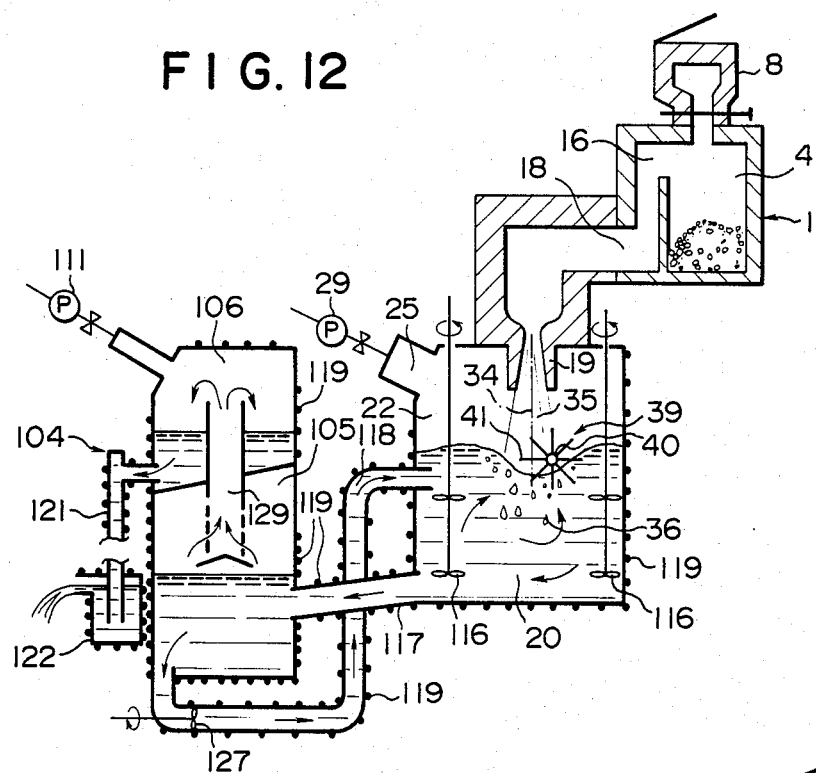
FIG. 12 is a schematic structural diagram, similar to FIGS. 8, 9, 10, and 11, showing the fifth preferred embodiment of the apparatus according to the present invention for retrieving metal in the liquid phase, which practices the fifth preferred embodiment of the method for retrieving metal according to the present invention.

In FIG. 12 there is shown a schematic structural view of an apparatus for retrieving metal in the liquid phase from a gas containing vapor of the metal, according to the fifth preferred apparatus embodiment of the present invention, which is particularly applied to the reduction of magnesium oxide by carbon as will be seen hereinafter, and which is used for practicing the fifth preferred embodiment of the method for retrieving metal in the liquid phase according to the present invention. This fifth preferred apparatus embodiment will be described in detail because it is much different from the four previously described embodiments. In this figure, parts of the fifth preferred apparatus embodiment shown, which correspond to parts of the first through fourth preferred apparatus embodiments shown in FIGS. 6, 7, 10, and 11, and which have the same functions, are designated by the same reference numerals and symbols as in those figures.

In FIG. 12, the reference numeral 1 generally denotes a reduction furnace which is substantially formed as a closed container, and which is constructed substantially in the same manner as the reduction furnace of the four previously described embodiments, having a furnace chamber 4 defined as a cavity within it, around which a heater (not particularly shown) is provided, so as to heat up the reduction furnace body and said furnace chamber 4. As before, in the upper end wall of the furnace chamber 4 there is provided a reaction material charging port, to which is coupled a reaction material charging hopper 8, and in a similar way to that described previously with respect to the first four embodiments of the present invention raw material for reaction (i.e., reduction) can be charged into the reaction furnace chamber 4 from the hopper 8 through the charging port without substantially deteriorating the gas tight condition of the reaction furnace chamber 4. In the lower end wall or bottom of the furnace chamber 4 there is provided a reaction residue discharge port for discharging reaction residues produced in the chamber 4 of the reaction furnace 1 by reduction (as will be explained later), although this is not shown in the figure.

The side wall of the furnace chamber 4 has a mixture gas discharge port 16 formed therein, and a mixture gas conduit 18 leads from this gas discharge port so as to communicate the furnace chamber 4 with a metallic vapor retrieving chamber 22 provided below and to the left as seen in the figure of the furnace chamber 4. Particularly according to an important principle of the present invention, the downstream end of this conduit is formed as a convergent-divergent nozzle or Laval nozzle 19 of the above described sort.

Within the lower part of the metallic vapor retrieving chamber 22, below and opposed to the lower end of the convergent-divergent nozzle 19, there is present during operation of the apparatus a pool 20 of molten retrieving metal. A slag take out port arrangement not shown in the figure is also provided for removing slag from the surface of the pool 20 of molten retrieving metal in the retrieving chamber 22. A vacuum port 25 is provided in the upper part of the retrieving chamber 22 and is connected, via a vacuum conduit, to a vacuum pump 29, for evacuating the interior parts of the furnace chamber 4 and the metallic vapor retrieving chamber 22 to appropriate vacuum levels, as will be described later. In this fifth preferred embodiment, two stirrers 116 are provided for agitating the molten pool 20 of retrieving metal in the metallic vapor retrieving chamber 22. As in the third preferred embodiment of the present invention, previously described, there is provided in the central part of the metallic vapor retrieving chamber 22 a vane wheel 39, which is structured with a horizontally rotatably mounted hub 40 and a plurality of vanes 41 projecting therefrom. The vane wheel 39 is rotatably mounted with the vanes 41 on its lower part at least partially submerged under the surface of the pool 20 of molten retrieving metal in the metallic vapor retrieving chamber 22, and with those of its vanes 41 on its left part as seen in FIG. 12 directly opposed to the convergent-divergent nozzle 19 in its axial line 34. Thus, when a jet flow 35 of reaction product gas is squirting out of the convergent-divergent nozzle 19, a major part of the metallic vapor in this jet flow impinges against these vanes 41 of the vane wheel 39 and sticks thereto in liquid form, so as to cause the vane wheel 39 as a whole to rotate in the counterclockwise direction as seen in the figure. Thus this rotation of the vane wheel 39 relatively gently brings this molten retrieved metal under the surface of the molten retrieving metal pool 20 in the retrieving chamber 22, so that the metal is retrieved by the metal pool 20 in a quite gentle manner. A heater 119 is provided around the retrieving chamber 22, for keeping the molten metal pool 20 therein in the melted state, as will be more particularly described later.

The bottommost part of the metallic vapor retrieving chamber 22 is communicated via a molten metal take out conduit 117 to a not quite bottommost part of an vaporation chamber 105, which is incorporated in a distillation apparatus, generally denoted by the reference numeral 104, which is provided below and to the left as seen in the figure of the furnace chamber 4. Further, the not quite bottommost part of the metallic vapor retrieving chamber 22 is communicated via a molten metal returning conduit 118 to the bottommost part of said evaporation chamber 105 of said distillation apparatus 104. Above the evaporation chamber 105 in the distillation apparatus 104 there is provided a condensation chamber 106. The heater 119 also surrounds the evaporation chamber 105 and the condensation chamber 106, and also the molten metal take out conduit 117 and the molten metal returning conduit 118, as well as the metallic vapor retrieval chamber 22 as previously explained, so as appropriately to heat up all these chambers and conduits and so as to keep the molten metal in them at appropriate temperatures, as will be explained in detail later. There is provided another vacuum pump 111, communicated to an upper part of the condensation chamber 106, for evacuating the interior parts of the distillation apparatus 104 to appropriate vacuum levels, as described later.

A pump or impeller mechanism 127 is provided in the molten metal returning conduit 118, in this embodiment, for providing an appropriate molten metal circulation in the apparatus, i.e. for urging the molten metal in the molten metal take out conduit 117 and the molten metal in the molten metal returning conduit 118 in the directions shown by the arrows in FIG. 12. A metal vapor passage 129 is provided as substantially vertically extending from the upper part of the evaporation chamber 105 to an upper part of the condensation chamber 106, and a conduit 121 is provided for taking out molten retrieved metal from the lower part of the condensation chamber 106 to a heated ladle 122; this conduit 121 is controlled by a valve which is not shown, so as to enable the operator to remove molten retrieved metal from the condensation chamber 106 without disturbing the depressurized state of the apparatus.

The General Operation of the Fifth Apparatus Embodiment

The shown apparatus according to the fifth preferred embodiment of the apparatus of the present invention is particularly suited for realizing a metal retrieval process as described above in which the pool 20 of molten metal used for retrieval is of a different type of metal from the metallic vapor which is to be retrieved, and is generally used as follows. First, material for reduction of an appropriate sort for producing gas or vapor of a metal which is required to be recovered or retrieved as will be understood in detail later is charged into the furnace chamber 4 of the reduction furnace 1, by charging this material into the charging hopper 8 and by then opening and closing the control valves associated therewith so as to transfer this reduction material into the furnace chamber 4 without allowing gas from the outside to enter the furnace chamber 4 in substantial amount. Then the heater is operated so as to heat up the furnace chamber 4 and the reaction material charged therein to a predetermined temperature $T_1$, so as to cause this reduction material to be reduced into a gas mixture containing vapor of the desired metal which is to be recovered or retrieved, said gas mixture being at a pressure $P_1$. This mixture gas then passes in the heated state through the opening in the side wall of the reduction furnace 1 and is then ejected from the furnace chamber 4, according to the difference of pressures between the interior of the furnace chamber 4 which is at said pressure $P_1$ and the interior of the metallic vapor retrieving chamber 22 which is kept at a pressure $P_2$ substantially lower than the pressure $P_1$, through the conduit which leads to the convergent-divergent nozzle 19 at its downstream end, into the metallic vapor retrieving chamber 22, and sprays out of the convergent-divergent nozzle 19 as a jet 35 which impinges against the surface of the pool 20 of molten retrieving metal in the bottom of said retrieving chamber 22. As this mixture gas passes through the convergent-detergent nozzle 19, as in the previous embodiments described above it reaches a supersonic speed and expands adiabatically very quickly, and thus the metal vapor in said mixture gas is very quickly cooled down by this adiabatic expansion to a second temperature $T_2$, and in fact may be at least partly condensed into fine metal droplets or particles. This cooling down is so quick that it occurs without said metal vapor having a chance to recombine with other constituents of said mixture gas (i.e., to be again oxidized thereby), due to the very quick cooling of said mixture gas, and the final second temperature $T_2$ down to which the mixture gas is cooled by the adiabatic expansion in the convergent-divergent nozzle 19 is so low as to be below the temperature at which the recombination or reoxidization reaction can substantially take place.

The jet 35 including cooled metallic vapor and possibly fine particles of liquid or solid metal thus produced impinges on the vanes 41 of the vane wheel 39, and is as described above thereby brought relatively gently beneath the surface of the pool 20 of molten retrieving metal in the bottom of said retrieving chamber 22, and thus the metal in said jet 35 becomes mixed with and entrained into the molten retrieving metal, which is envisaged as being, as explained above, of a different sort from said metal to be retrieved. Bubbles 36 of gas from the jet may become temporarily entrained below the surface of the pool 20 of molten retrieving metal, but this need not cause any substantial problem. The mixture pool 20 of the molten retrieving metal and the retrieved metal in the metallic vapor retrieving chamber 22 is kept agitated and thus well mixed together by the two stirrers 116. The retrieving chamber 22 is maintained at its pressure $P_2$ by the remainder gas from the jet 35 being sucked out of said retrieving chamber 22, via the port 25 and the conduit provided therefor, by the operation of the vacuum pump 29. The sucking rate of the pump 29 thus is controlled so as to maintain the pressures in the furnace chamber 4 and in the metallic vapor retrieving chamber 22 at substantially their respective desired values $P_1$ and $P_2$, according of course also to various other parameters of the apparatus and its operation. From time to time, some of the slag in the bottom portion of the furnace chamber 4 is removed via the port provided therefor (not shown), without disturbing the depressurized state of the apparatus, and similarly slag on the pool 20 of metal mixture in the retrieving chamber 22 is removed.

Thereby, the molten retrieval metal pool 20 in the retrieval chamber 22 becomes more and more charged with retrieved metal from the metallic vapor which has squirted through the convergent-divergent nozzle 19. Now, the operation of the pump or impeller 127 maintains a steady circulation of this molten metal pool 20 in the directions as shown by the arrows in FIG. 12 to take this molten metal including retrieved metal out from the retrieval chamber 22, through the molten metal take out conduit 117, into the evaporation chamber 105 wherein it is heated up by the action of the heater 119 to a temperature substantially higher than the boiling point of the retrieved metal (i.e. the metal whose vapor was produced by reaction in the reaction furnace 1) but substantially lower than the boiling point of the metal for retrieval which was originally charged into the retrieval chamber 22, which is a different metal from and which has a higher boiling point, than the metal which is to be retrieved. Thus, at this time, all or at least a substantial amount of the retrieved metal is boiled off from the surface of the molten metal in the evaporation chamber 105 as a gas or vapor, leaving behind a molten metal mass which is at least substantially depleted of the lower boiling point retrieved metal, and is thus substantially proportionally enriched with the higher boiling point retrieval metal. From this evaporation chamber 105, this molten metal is then returned via the molten material returning conduit 118 to the retrieval chamber 22, therein to again receive metal vapor to be retrieved; while the vapor crossing substantially only of retrieved metal which is being evaporated from the surface of the molten metal mass contained in said evaporation chamber 105 passes through the conduit 129 and into the condensation chamber 106, to be therein condensed according to the temperature maintained therein which is substantially below the boiling point of said metal which is to be retrieved. Subsequently, this substantially pure molten retrieved metal in said condensation chamber 104 is removed therefrom via the conduit 121 into the ladle 122.

Description of the Fifth Method Embodiment

The fifth preferred apparatus embodiment of the present invention described above was operated by charging a mixture of magnesium oxide powder (which in fact was made by oxidizing magnesium sulphide and refining it) and carbon, in equal mol amounts, formed into lumps as a raw material for reduction, into the furnace chamber 4 of the reduction furnace 1, by operating the vacuum pump 29, by operating the heaters, by charging a substantially pure mass of lead metal as a metal for retrieval into the metallic vapor retrieving chamber 22, and by melting said lead metal into a pool 20 of retrieving molten metal for retrieving the magnesium vapor produced by reduction in the reduction furnace 1. Thus, in this embodiment, the retrieving metal (lead) used for the retrieving metal pool 20 was a different metal from the metal (magnesium) which was to be retrieved. The temperature $T_1$ to which the furnace chamber 4 and the reduction material charged thereinto were heated was 1800° C., and the rate of suction of the vacuum pump 29 was controlled so as to keep the pressure $P_1$ within the furnace chamber 4 at approximately 100 torr and so as to keep the pressure $P_2$ within the metallic vapor retrieving chamber 22 at approximately 5 to 6 torr. The heater 119 was so operated as to keep the temperature within the metallic vapor retrieving chamber 22 at about 580° to 600° C., so as to keep the retrieving metal pool 20 of lead metal therein in the molten state.

As explained above, the magnesium oxide in the reaction chamber 4 of the reduction furnace 1 was reduced by the carbon, so as to produce metallic magnesium in vapor form and oxidizing gas such as carbon monoxide, and this mixture of metallic magnesium vapor and oxidizing gas then flowed out through the conduit 18 and through the convergent-divergent nozzle 19 into the metallic vapor retrieving chamber 22, attaining a supersonic speed as it passed through the convergent-divergent nozzle 19. In fact, in this fifth embodiment, the nozzle 19 was again functioning under the insufficient expansion condition. The jet flow 35 thus produced was quickly cooled down by adiabatic expansion in the nozzle 19 below the temperature at which the reverse reaction of the oxidizing gas oxidizing the magnesium vapor could occur, and impinged against the vanes 41 of the vane wheel 39 so as to be slowed thereby and to lose some of its kinetic energy, molten magnesium which collected on said vanes and also the jet flow 35 as a whole then impinging relatively gently on and plunging under the surface of the molten retrieving lead metal pool 20 within the metallic vapor retrieving chamber 22, and the magnesium vapor (which in fact was partially liquefied and/or solidified) in said jet flow was entrained into and mixed with the molten lead metal pool 20.

The entrained magnesium was then of course brought to the liquefied state by this entrainment into the retrieving lead metal pool, and remained therein; and the oxidizing gas (including the carbon monoxide) in the mixture then, after plunging into the molten lead pool 20 and temporarily forming bubbles such as the shown bubbles 36 in the molten lead pool 20, rose to the surface and was sucked away from the vacuum pump 29. The magnesium and the lead which thus were together molten in the pool 20 were kept well mixed together by the stirrers 116. Thereby, the molten lead retrieval metal pool 20 in the retrieval chamber 22 became more and more charged with retrieved magnesium metal from the magnesium vapor which had squirted through the convergent-divergent nozzle 19.

As described above, the operation of the pump or impeller 127 maintained a steady circulation of this molten mixture of lead and magnesium metals, in the directions as shown by the arrows in FIG. 12, between the retrieval chamber 22 and the evaporation chamber 105, through the molten metal take out conduit 117 and the molten metal returning conduit 118. In the evaporation chamber 105, this metal mixture was heated up by the action of the heater 119 to a temperature of about 850° to 900° C., which was a temperature substantially higher than the boiling point of the retrieved magnesium metal but substantially lower than the boiling point of the lead metal for retrieval which was originally charged into the retrieval chamber 22. Thus, at this time, all or at least a substantial amount of the retrieved magnesium metal was boiled off from the surface of the molten metal mixture in the evaporation chamber 105 as a gas or vapor, leaving behind a molten metal mass which was at least substantialy depleted of the lower boiling point retrieved magnesium metal, and was thus substantially proportionally enriched with the higher boiling point lead retrieval metal. From this evaporation chamber 105, this molten metal was then returned via the molten metal returning conduit 118 to the retrieval chamber 22, therein to again receive magnesium metal vapor to be retrieved; while the vapor consisting substantially only of retrieved magnesium metal which was being evaporated from the surface of the molten mixture metal mass contained in said evaporation chamber 105 passed through the conduit 129 and into the condensation chamber 106, to be therein condensed according to the temperature maintained therein which was approximately 680° to 700° C., i.e. substantially below the boiling point of said magnesium metal which was to be retrieved. By the way, the condensation chamber 106 was maintained at a pressure of approximately 6 to 10 torr by the vacuum pump 111. Subsequently, this substantially pure molten retrieved magnesium metal in said condensation chamber 106 was removed therefrom via the conduit 121 into the ladle 122.

In fact, this process operated continuously at such a rate that the mol ratio of retrieved molten magnesium in the molten metal pool 20 in the metallic vapor retrieving chamber 22 was kept at about 50%. The retrieval ratio of magnesium, in this fifth preferred embodiment, was 97.8%. The average purity of the retrieved magnesium was 97.9%.

The results described above of operating the fifth embodiment of the apparatus of the present invention according to the fifth preferred embodiment of the method of the present invention show that in the case of a metal such as magnesium, which has a relatively high melting point, and which has a relatively high tendency to become reoxidized, a result of retrieving metallic vapor from the gas products of a reduction reaction which is better both with regard to retrieval ratio and with regard to purity of final product can be obtained, when the retrieval metal is different from the magnesium metal which is being retrieved, and in particular is lead.

The Construction of the Sixth Apparatus Embodiment

Figure 13:
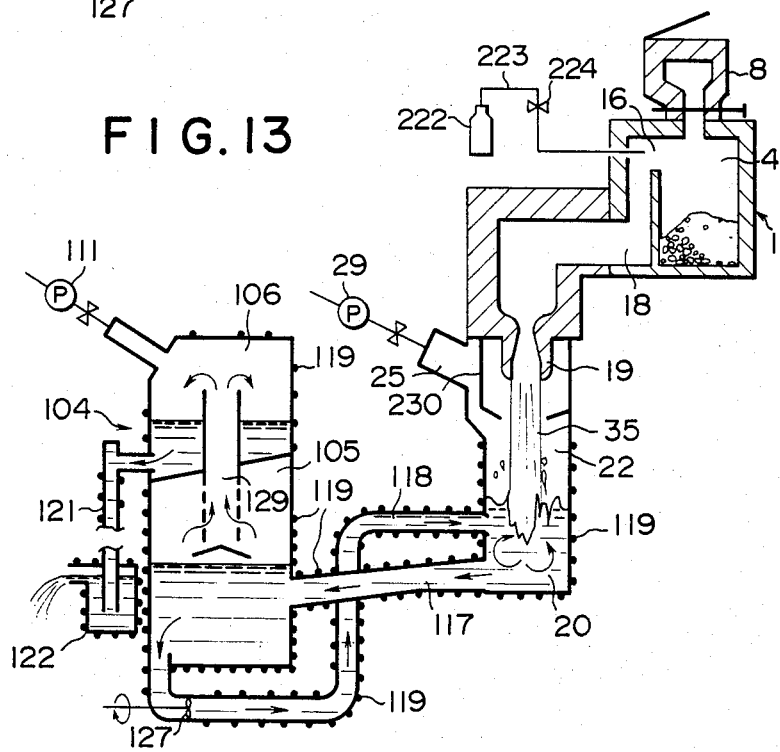
FIG. 13 is a schematic structural diagram, similar to FIGS. 8, 9, 10, 11, and 12, showing the sixth preferred embodiment of the apparatus according to the present invention for retrieving metal in the liquid phase, which practices the sixth preferred embodiment of the method for retrieving metal according to the present invention.

In FIG. 13 there is shown a schematic structural view of an apparatus for retrieving metal in the liquid phase from a gas containing vapor of the metal, according to the sixth and last preferred apparatus embodiment of the present invention, which is again particularly applied to the reduction of magnesium oxide by carbon as will be seen hereinafter, and which is used for practicing the sixth preferred embodiment of the method for retrieving metal in the liquid phase according to the present invention. In this figure, parts of the sixth preferred apparatus embodiment shown, which corresponds to parts of the first through fifth preferred apparatus embodiments shown in FIGS. 8 through 12, and which have the same functions, are designated by the same reference numerals and symbols as in those figures.

In this sixth preferred embodiment, the construction of the reduction furnace 1 and the furnace chamber 4 therein is substantially the same as in the fifth preferred embodiment, except that a cylinder 222 suitable for containing an inert gas such as argon gas is connected via a conduit 223 and a valve 224 so as to supply a controllable amount of inert gas such as argon gas to the interior of said furnace chamber 4. Again, the products of the reduction reaction in the furnace chamber 4, augmented by this controllable amount of inert gas fed from the cylinder 222, pass out therefrom down the conduit to the convergent-divergent nozzle or Laval nozzle 19 of the previously described sort.

The metallic vapor retrieving chamber 22 is structured similarly to that of the fifth preferred embodiment, except for the following points. No vane wheel such as the vane wheel 39 of the fifth preferred embodiment is provided for slowing down the speed of the jet 35 of reaction gases and metal vapor which is being squirted out from the nozzle 19, and in line with this structural feature the metallic vapor retrieving chamber 22 is shaped as somewhat thinner and taller than the retrieving chamber 22 of the fifth preferred embodiment shown in FIG. 12. Further, since the jet 35 will thus hit the surface of the molten retrieving metal pool 20 in this retrieving chamber 22 much harder and quicker, no stirrers such as the stirrers 116 of the fifth preferred embodiment are provided, in this sixth preferred embodiment, since the force of this jet 35 is sufficient for agitating the molten metal pool 20 and keeping it well mixed (i.e., for keeping the retrieved metal well mixed with the retrieving metal which is intended to be different from said retrieved metal, as in the fifth preferred embodiment). Further, a shield member 230 is provided for preventing splashes of molten metal from being splashed up by the jet 35 to pass into the conduit leading to the vacuum pump 29.

As in the fifth preferred embodiment, the lower parts of the metallic vapor retrieving chamber 22 are communicated via the molten metal take out conduit 117 and the molten metal returning conduit 118 to the evaporation chamber 105, which is incorporated in the distillation apparatus 104, which is provided below and to the left as seen in the figure of the furnace chamber 4, and which is substantially the same in construction as the distillation apparatus 104 of the fifth preferred embodiment shown in FIG. 12.

The General Operation of the Sixth Apparatus Embodiment

The shown apparatus according to the sixth preferred embodiment of the apparatus of the present invention is again particularly suited for realizing a metal retrieval process as described above in which the pool 20 of molten metal used for retrieval is of a different type of metal from the metallic vapor which is to be retrieved, and is generally used in a manner similar to that in which the fifth preferred embodiment is used; except for the following points. First, an inert gas such as argon gas is continuously injected at a controlled flow rate from the cylinder 222 into the furnace chamber 4, while the material for reduction of an appropriate sort for producing gas or vapor of the metal which is required to be recovered or retrieved is being reduced into a gas mixture containing vapor of said desired metal to be retrieved, thus augmenting the pressure of said gas mixture, which is brought to be at a pressure $P_1$, which of course can be freely adjusted within limits by control of the amount of supplemented inert gas. This mixture gas containing gas (such as argon gas) then passes in the heated state through the opening in the side wall of the reduction furnace 1 and is then ejected from the furnace chamber 4, as before, according to the difference of pressures between the interior of the furnace chamber 4 which is at said pressure $P_1$ and the interior of the metallic vapor retrieving chamber 22 which is kept at a pressure $P_2$ substantially lower than the pressure $P_1$, through the conduit 18 which leads to the convergent-divergent nozzle 19 at its downstream end, into the metallic vapor retrieving chamber 22, and sprays out of the convergent-divergent nozzle 19 as a jet 35 which impinges against the surface of the pool 20 of molten retrieving metal in the bottom of said retrieving chamber 22. As this mixture gas passes through the convergent-divergent nozzle 19, as in the previous embodiments described above it reaches a supersonic speed and expands adiabatically very quickly, and thus the metal vapor in said mixture gas is very quickly cooled down by this adiabatic expansion to a second temperature $T_2$, and again in fact may be at least partly condensed into fine metal droplets or particles. This cooling down is again so quick that it occurs without said metal vapor having a chance to recombine with other constituents of said mixture gas (i.e., to be again oxidized thereby), due to the very quick cooling of said mixture gas, and the final second temperature $T_2$ down to which the mixture gas is cooled by the adiabatic expansion in the convergent-divergent nozzle 19 is so low as to be below the temperature at which the recombination or reoxidization reaction can substantially take place. It is particularly planned, in this operation of the convergent-divergent nozzle 19 of the sixth preferred embodiment of the present invention, according to the supplementation of the volume of the reaction gases produced in the reaction chamber 4 by the injected inert gas such as argon gas from the cylinder 222, that said nozzle 19 should be operated under the proper expansion condition. The jet 35 from the convergent-divergent nozzle 19 impinges quite violently on the surface of pool 20 of molten retrieving metal in the bottom of the retrieving chamber 22, and thus the metal in said jet 35 becomes mixed with and entrained into the molten retrieving metal, which is envisaged as being, as explained above, of a different sort from said metal to be retrieved. Bubbles of gas from the jet 35 may become temporarily entrained below the surface of the pool 20 of molten retrieving metal, but this need not cause any substantial problem. The mixture pool 20 of the molten retrieving metal and the retrieved metal in the metallic vapor retrieving chamber 22 is kept agitated and thus well mixed together by the violence of the uncushioned impact of the jet 35, without need for any stirrers like the stirrers 116 of the fifth preferred embodiment. As before, the retrieving chamber 22 is maintained at its pressure $P_2$ by the remainder gas from the jet 35 (including the supplemental inert gas) being sucked out of said retrieving chamber 22, via the port and the conduit provided therefor, by the operation of the vacuum pump 29, said conduit being as mentioned above shielded by the shield 230. The sucking rate of the pump 29 again is controlled so as to maintain the pressures in the furnace chamber 4 and in the metallic vapor retrieving chamber 22 at substantially their respective desired values $P_1$ and $P_2$, according of course also to various other parameters of the apparatus and its operation.

Thereby, the molten retrieval metal pool 20 in the retrieval chamber 22 becomes more and more charged with retrieved metal from the metallic vapor which has squirted through the convergent-divergent nozzle 19. The operation of the distillation apparatus 104 for separating out the desired metal to be retrieved (which was reduced in the reduction furnace 4) is quite the same as in the fifth preferred embodiment described above, and hence will not be particularly discussed herein.

Description of the Sixth Method Embodiment

The sixth preferred apparatus embodiment of the present invention described above was operated, in a fashion similar to the fifth preferred method embodiment described above, by charging a mixture of magnesium oxide powder and carbon, in equal mol amounts, formed into lumps as a raw material for reduction, into the furnace chamber 4 of the reduction furnace 1, by operating the vacuum pump 29, by operating the heaters, by charging a substantially pure mass of lead metal as a metal for retrieval into the metallic vapor retrieving chamber 22, and by melting said lead metal into a pool 20 of retrieving molten metal for retrieving the magnesium vapor produced by reduction in the reduction furnace 1. Thus, again, in this sixth preferred embodiment, the retrieving metal (lead) used for the retrieving metal pool 20 was a different metal from the metal (magnesium) which was to be retrieved. The temperature $T_1$ to which the furnace chamber 4 and the reduction material charged thereinto were heated was 1800° C., and the rate of suction of the vacuum pump 29 and the rate of injection of supplemental inert gas (which was argon gas) were controlled so as to keep the pressure $P_1$ within the furnace chamber 4, this time, at approximately 150 torr, and so as to keep the pressure $P_2$ within the metallic vapor retrieving chamber 22 at approximately 12 to 14 torr. The heater 119 was so operated as to keep the temperature within the metallic vapor retrieving chamber 22 at about 580° to 600° C., so as to keep the retrieving metal pool 20 of lead metal therein in the molten state.

The magnesium oxide in the reaction chamber 4 of the reduction furnace 1 was reduced by the carbon, so as to produce metallic magnesium in vapor form and oxidizing gas such as carbon monoxide, and this mixture of metallic magnesium vapor and oxidizing gas, mixed with the supplemental argon gas, then flowed out through the conduit 18 and through the convergent-divergent nozzle 19 into the metallic vapor retrieving chamber 22, attaining a supersonic speed as it passed through the convergent-divergent nozzle 19. In fact, in this sixth embodiment, the nozzle 19 this time functioned under the proper expansion condition. The jet flow 35 thus produced was quickly cooled down by adiabatic expansion in the nozzle 19 to below the temperature at which the reverse reaction of the oxidizing gas oxidizing the magnesium vapor could occur, in fact to a temperature of about 500° to 550° C., and impinged against the surface of the molten retrieving lead metal pool 20 within the metallic vapor retrieving chamber 22, and the magnesium vapor (which in fact was partially liquefied and/or solidified) in said jet flow 35 was entrained into and mixed with the molten lead metal pool 20. The entrained magnesium was then of course brought to the liquefied state by this entrainment into the retrieving lead metal pool, and remained therein; and the oxidizing gas (including the carbon monoxide) and the argon gas in the gas mixture then, after plunging into the molten lead pool 20 and temporarily forming bubbles therein, rose to the surface and was sucked away by the vacuum pump 29. The magnesium and the lead which thus were together molten in the pool 20 were kept well mixed together by the force of the jet 35. Thereby, the molten lead retrieval metal pool 20 in the retrieval chamber 22 became more and more charged with retrieved magnesium metal from the magnesium vapor which had squirted through the convergent-divergent nozzle 19. Subsequently, the retrieved magnesium metal was separated out from the lead retrieving metal by the distillation apparatus 104, as in the operation of the fifth preferred embodiment described above.

The retrieval ratio of magnesium, in this sixth preferred embodiment, was 98.2%. The average purity of the retrieved magnesium was 98.9%.

The results described above of operating the sixth embodiment of the apparatus of the present invention according to the sixth preferred embodiment of the method of the present invention show that by the addition of sufficient argon gas to keep the convergent-divergent nozzle 19 functioning in the proper expansion condition the result of retrieving metallic vapor from the gas products of a reduction reaction can be superlative, both with regard to retrieval ratio and with regard to purity of the final product.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. A method of retrieving metallic vapor from a mixture gas containing said metallic vapor together with oxidizing gas, comprising:

leading said mixture gas at a high enough temperature and a low enough pressure to substantially prevent any oxidization reaction between the metallic vapor and the oxidizing gas from taking place, into a convergent-divergent nozzle having an upstream end, into which said gas is lead, and a downstream end, and directing the resulting jet of mixture gas from the downstream end of the convergent-divergent nozzle, which jet of mixture gas has been cooled rapidly by adiabatic expansion in said convergent-divergent nozzle to a low enough temperature to substantially prevent the occurrence of any oxidization reaction between the metallic vapor and the oxidizing gas, directly to the surface of a pool of molten retrieving metal.

2. A method according to claim 1, wherein said retrieving metal is the same metal as said metallic vapor.

3. A method according to claim 2, wherein said metallic vapor and said retrieving metal are both zinc.

4. A method according to claim 2, wherein said metallic vapor and said retrieving metal are both magnesium.

5. A method according to claim 1, wherein additionally inert gas is added to said mixture gas before said upstream end of said convergent-divergent nozzle.

6. A method according to claim 1, wherein said retrieving metal pool is agitated by a mechanical stirrer.

7. A method according to claim 1, wherein said retrieving metal pool is agitated only by said jet flow from said convergent-divergent nozzle.

8. A method according to claim 1, wherein said retrieving metal is a different metal from said metallic vapor.

9. A method according to claim 8, wherein said metallic vapor is magnesium, and said retrieving metal is selected from the group composed of lead, bismuth, tin, antimony, and mixtures thereof.

10. A method according to claim 9, wherein said retrieving metal is selected from the group composed of lead, bismuth, and mixtures thereof.

* * * * *